US009857096B2

(12) United States Patent
Mihu et al.

(10) Patent No.: US 9,857,096 B2
(45) **Date of Patent: *Jan. 2, 2018**

(54) FLUID HEATING SYSTEM AND INSTANT FLUID HEATING DEVICE

(71) Applicant: EEMAX, INC., Waterbury, CT (US)

(72) Inventors: Sergiu Gabriel Mihu, Newtown, CT (US); Eric R. Jurczyszak, Berlin, CT (US); Chris Hayden, Shelton, CT (US)

(73) Assignee: EEMAX, INC., Waterbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,251

(22) Filed: May 4, 2016

(65) Prior Publication Data

US 2016/0245546 A1 Aug. 25, 2016

Related U.S. Application Data

(63) Continuation-in-part of application No. 14/824,897, filed on Aug. 12, 2015, now Pat. No. 9,410,720, (Continued)

(51) Int. Cl.
*A47J 31/00* (2006.01)
*H05B 3/78* (2006.01)
(Continued)

(52) U.S. Cl.
CPC ............... *F24H 1/101* (2013.01); *F24H 1/08* (2013.01); *F24H 1/105* (2013.01); *F24H 9/2028* (2013.01);
(Continued)

(58) Field of Classification Search
None
See application file for complete search history.

(56) References Cited

U.S. PATENT DOCUMENTS 270,478 A 1/1883 Pumphrey
601,585 A 3/1898 McElroy
(Continued)

FOREIGN PATENT DOCUMENTS

CN 201844531 5/2011
CN 102200346 A 9/2011
(Continued)

OTHER PUBLICATIONS

Office Action dated May 10, 2016, in co-pending U.S. Appl. No. 14/973,223.

(Continued)

*Primary Examiner* — Thor Campbell
(74) *Attorney, Agent, or Firm* — Oblon, McClelland, Maier & Neustadt, L.L.P.

(57) ABSTRACT

A fluid heating system may be installed for residential and commercial use, and may deliver fluid at consistent high temperatures for cooking, sterilizing tools or utensils, hot beverages and the like, without a limit on the number of consecutive discharges of fluid. The fluid heating system is installed with a tankless fluid heating device that includes an inlet port, an outlet port, at least one heat source connected with the inlet port, and a valve connecting the at least one heat source to the outlet port. A temperature sensor is downstream of the at least one heat source and connected to the valve. Another temperature sensor is on the heat source to enable it to be kept at an elevated temperature. The valve is operated so that an entire volume of a fluid discharge from the fluid heating system is delivered at a user-specified temperature on demand, for every demand.

20 Claims, 15 Drawing Sheets

Related U.S. Application Data which is a continuation of application No. 13/840,066, filed on Mar. 15, 2013, now Pat. No. 9,140,466.

(60) Provisional application No. 61/672,336, filed on Jul. 17, 2012.

(51) Int. Cl.

| | |
|---|---|
| ***F24H 1/10*** | (2006.01) |
| ***F24H 9/20*** | (2006.01) |
| ***H05B 1/02*** | (2006.01) |
| ***F24H 1/08*** | (2006.01) |
| *F24D 17/00* | (2006.01) |

(52) U.S. Cl.

CPC ....... *H05B 1/0283* (2013.01); *F24D 17/0089* (2013.01)

(56) References Cited

U.S. PATENT DOCUMENTS

| | | | | |
|---|---|---|---|---|
| 1,718,970 | A | 7/1929 | Lonergan | |
| 1,729,483 | A | 9/1929 | Koch | |
| 1,777,774 | A | 10/1930 | Breuer | |
| 1,821,525 | A | 9/1931 | Nielsen | |
| 1,851,851 | A | 3/1932 | Lee et al. | |
| 2,032,416 | A | 3/1936 | Hunt | |
| 2,041,687 | A | 5/1936 | Benson | |
| 2,224,422 | A | 12/1940 | Ballman | |
| 2,360,019 | A | 10/1944 | Ryan et al. | |
| 2,576,298 | A | 11/1951 | Kessler | |
| 2,589,566 | A | 3/1952 | Neth et al. | |
| 2,681,409 | A | 6/1954 | Dobbins | |
| 2,730,609 | A | 1/1956 | Constantinesco | |
| 2,824,199 | A | 2/1958 | Browne | |
| 2,996,316 | A | 8/1961 | Terhune | |
| 3,088,017 | A | 4/1963 | Schomann | |
| 3,108,174 | A | 10/1963 | Hynes | |
| 3,310,769 | A | 3/1967 | Simmons | |
| 3,313,921 | A | 4/1967 | Mohn et al. | |
| 3,329,455 | A | 7/1967 | Becker et al. | |
| 3,512,114 | A | 5/1970 | Dzaack | |
| 3,625,549 | A | 12/1971 | De Vries | |
| 3,633,748 | A | 1/1972 | Hanley et al. | |
| 3,921,505 | A | 11/1975 | Wunsch | |
| 3,977,073 | A | 8/1976 | Shirey | |
| 4,056,143 | A | 11/1977 | Martin | |
| 4,142,515 | A | 3/1979 | Skaats | |
| 4,185,187 | A | 1/1980 | Rogers | |
| 4,242,775 | A | 1/1981 | Eickmann | |
| 4,250,399 | A | 2/1981 | King | |
| 4,270,367 | A | 6/1981 | Santore | |
| 4,338,888 | A | 7/1982 | Gerstmann et al. | |
| 4,439,669 | A | 3/1984 | Ryffel | |
| 4,460,201 | A | 7/1984 | McGugan | |
| 4,600,334 | A | 7/1986 | Soussloff | |
| 4,682,578 | A | 7/1987 | Schmidt | |
| 4,762,980 | A | 8/1988 | Insley | |
| 4,775,258 | A | 10/1988 | Lange | |
| 4,808,793 | A | 2/1989 | Hurko | |
| 4,813,992 | A | 3/1989 | Hale | |
| 4,835,365 | A | 5/1989 | Etheridge | |
| 4,885,840 | A | 12/1989 | McManus | |
| 4,892,432 | A | 1/1990 | Cooper | |
| 5,054,108 | A * | 10/1991 | Gustin | H05B 3/44 392/422 |
| 5,122,640 | A | 6/1992 | Holmes | |
| 5,124,534 | A | 6/1992 | Williams et al. | |
| RE34,018 | E | 8/1992 | Petersen et al. | |
| 5,216,743 | A * | 6/1993 | Seitz | F24H 1/102 219/497 |
| 5,243,185 | A | 9/1993 | Blackwood | |
| 5,269,572 | A | 12/1993 | Mefferd | |
| 5,293,446 | A | 3/1994 | Owens et al. | |
| 5,308,207 | A | 5/1994 | Jaskowiak | |
| 5,325,822 | A | 7/1994 | Fernandez | |
| 5,384,032 | A | 1/1995 | De Souza | |
| 5,400,432 | A | 3/1995 | Kager et al. | |
| 5,408,578 | A * | 4/1995 | Bolivar | F24H 1/102 219/481 |
| 5,549,078 | A | 8/1996 | Annecharico et al. | |
| 5,559,924 | A | 9/1996 | Kadotani et al. | |
| 5,628,895 | A | 5/1997 | Zucholl | |
| 5,740,315 | A | 4/1998 | Onishi et al. | |
| 5,772,355 | A | 6/1998 | Ross et al. | |
| 5,897,269 | A | 4/1999 | Ross et al. | |
| 5,930,458 | A | 7/1999 | Yane et al. | |
| 5,959,254 | A | 9/1999 | Martin, Sr. | |
| 5,995,711 | A | 11/1999 | Fukuoka et al. | |
| 6,005,225 | A | 12/1999 | Kowalski et al. | |
| 6,020,577 | A | 2/2000 | Barker | |
| 6,055,360 | A | 4/2000 | Inoue et al. | |
| 6,091,890 | A | 7/2000 | Gruzdev et al. | |
| 6,097,007 | A | 8/2000 | Wang | |
| 6,157,778 | A | 12/2000 | Kadotani | |
| 6,199,515 | B1 | 3/2001 | Clarke | |
| 6,231,194 | B1 | 5/2001 | Raj et al. | |
| 6,236,810 | B1 | 5/2001 | Kadotani | |
| 6,240,250 | B1 * | 5/2001 | Blanco, Jr. | F24H 1/102 392/474 |
| 6,246,831 | B1 * | 6/2001 | Seitz | F24H 9/2021 219/483 |
| 6,252,220 | B1 | 6/2001 | Jedlicka et al. | |
| 6,259,070 | B1 | 7/2001 | Audet | |
| 6,297,740 | B1 | 10/2001 | Hill et al. | |
| 6,345,769 | B2 | 2/2002 | MacIntyre | |
| 6,509,554 | B2 | 1/2003 | Howard et al. | |
| 6,593,553 | B2 | 7/2003 | Whitfield | |
| 6,909,843 | B1 | 6/2005 | Fabrizio | |
| 7,007,316 | B2 * | 3/2006 | Lutz, II | G05D 23/1393 4/620 |
| 7,039,305 | B1 * | 5/2006 | Chen | F24H 9/2028 392/465 |
| 7,046,922 | B1 * | 5/2006 | Sturm | F24H 9/2028 392/465 |
| 7,156,425 | B2 | 1/2007 | Atkinson | |
| 7,190,894 | B2 * | 3/2007 | Chamberlain, Jr. | F24D 17/00 392/465 |
| 7,293,914 | B2 | 11/2007 | Wang | |
| 7,324,746 | B2 | 1/2008 | Tanaka et al. | |
| 7,592,572 | B2 | 9/2009 | Schlipf | |
| 7,593,625 | B2 | 9/2009 | Kamikawa et al. | |
| 7,668,444 | B2 | 2/2010 | Tsai | |
| 7,744,008 | B2 | 6/2010 | Chapman, Jr. et al. | |
| 7,857,002 | B2 | 12/2010 | Reck | |
| 7,972,077 | B2 | 7/2011 | Kim | |
| 8,104,434 | B2 | 1/2012 | Fabrizio | |
| 8,165,461 | B2 * | 4/2012 | Sullivan | F24H 1/142 392/465 |
| 8,280,236 | B2 | 10/2012 | Fabrizio | |
| 8,304,699 | B2 * | 11/2012 | Fliess | B67D 1/0888 219/492 |
| 8,380,056 | B2 | 2/2013 | Evans | |
| 8,426,779 | B2 | 4/2013 | Schlipf | |
| 8,577,211 | B2 * | 11/2013 | Lucker | F24H 1/142 392/470 |
| 9,140,466 | B2 | 9/2015 | Jurczyszak et al. | |
| 2002/0008970 | A1 | 1/2002 | Hanson et al. | |
| 2003/0026603 | A1 | 2/2003 | Castaneda et al. | |
| 2004/0051313 | A1 | 3/2004 | Trouyet | |
| 2004/0069517 | A1 | 4/2004 | Olson | |
| 2004/0098831 | A1 | 5/2004 | Elmer | |
| 2005/0072103 | A1 | 4/2005 | Hopwood | |
| 2006/0168756 | A1 | 8/2006 | Sato et al. | |
| 2006/0215178 | A1 | 9/2006 | Seko et al. | |
| 2006/0222349 | A1 | 10/2006 | Sturm et al. | |
| 2007/0017265 | A1 | 1/2007 | Andersson | |
| 2007/0023418 | A1 | 2/2007 | Schlipf | |
| 2008/0028512 | A1 | 2/2008 | Hughson | |
| 2008/0152331 | A1 * | 6/2008 | Ryks | F24H 1/08 392/490 |
| 2008/0274823 | A1 | 11/2008 | Lindner | |
| 2009/0025399 | A1 | 1/2009 | Kamen et al. | |

(56) References Cited

U.S. PATENT DOCUMENTS

| | | | |
|---|---|---|---|
| 2009/0034947 A1 | 2/2009 | Tsai | |
| 2009/0116826 A1 | 5/2009 | Evans | |
| 2010/0068123 A1 | 3/2010 | Edwin et al. | |
| 2010/0086289 A1 | 4/2010 | Johnson et al. | |
| 2010/0093205 A1 | 4/2010 | Stone et al. | |
| 2010/0126108 A1 | 5/2010 | Andrikopoulos | |
| 2010/0195991 A1* | 8/2010 | Deivasigamani | F24D 17/0026 392/308 |
| 2010/0212752 A1 | 8/2010 | Fima | |
| 2011/0203781 A1 | 8/2011 | Ellingwood et al. | |
| 2011/0233191 A1 | 9/2011 | Gubler et al. | |
| 2011/0240269 A1 | 10/2011 | Mackenzie | |
| 2011/0318090 A1 | 12/2011 | Lai | |
| 2012/0055917 A1 | 3/2012 | Kimmins et al. | |
| 2012/0063755 A1 | 3/2012 | Lucker et al. | |
| 2012/0141100 A1 | 6/2012 | Evans | |
| 2012/0237191 A1 | 9/2012 | Clark | |
| 2012/0275775 A1 | 11/2012 | Iskrenovic | |
| 2013/0034344 A1 | 2/2013 | Lutz et al. | |
| 2013/0156492 A1 | 6/2013 | Maier | |
| 2014/0023352 A1 | 1/2014 | Jurczyszak et al. | |
| 2014/0023354 A1 | 1/2014 | Hankins et al. | |

FOREIGN PATENT DOCUMENTS

| | | |
|---|---|---|
| DE | 197 26 288 A1 | 6/1997 |
| EP | 2 573 642 A2 | 3/2013 |
| JP | 11-148716 | 6/1999 |
| WO | WO 98/31045 A2 | 7/1998 |

OTHER PUBLICATIONS

International Search Report dated Jun. 5, 2013 in PCT/US13/32298 filed Mar. 15, 2013.

International Written Opinion dated Jun. 5, 2013 in PCT/US13/32298 filed Mar. 15, 2013.

International Search Report dated Jan. 3, 2014, in PCT/US2013/050897, filed Jul. 17, 2013.

Written Opinion of the International Searching Authority dated Jan. 3, 2014, in PCT/US2013/050897, filed Jul. 17, 2013.

Office Action dated Apr. 24, 2015, in co-pending U.S. Appl. No. 13/943,495.

Combined Chinese Office Action and Search Report dated Sep. 25, 2015 in Patent Application No. 201380046720.5 (with English language translation).

* cited by examiner

FLUID HEATING SYSTEM AND INSTANT FLUID HEATING DEVICE

CROSS REFERENCE TO RELATED APPLICATIONS

This application is a continuation-in-part application of U.S. application Ser. No. 14/824,897 filed Aug. 12, 2015, which is a continuation application of U.S. application Ser. No. 13/840,066 filed Mar. 15, 2013, which is based upon and claims the benefit of priority from the U.S. Provisional Application No. 61/672,336, filed on Jul. 17, 2012, the entire contents of each are incorporated herein by reference.

BACKGROUND OF THE INVENTION

Conventional fluid heating devices slowly heat fluid enclosed in a tank and store a finite amount of heated fluid. Once the stored fluid is used, conventional fluid heating devices require time to heat more fluid before being able to dispense fluid at a desired temperature. Heated fluid stored within the tank may be subject to standby losses of heat as a result of not being dispensed immediately after being heated. While fluid is dispensed from a storage tank, cold fluid enters the tank and is heated. However, when conventional fluid heating devices are used consecutively, the temperature of the fluid per discharge is often inconsistent and the discharged fluid is not fully heated.

Users desiring fluid at specific temperature often employ testing the fluid temperature by touch until a desired temperature is reached. This can be dangerous, as it increases the risk that a user may be burned by the fluid being dispensed, and can cause the user to suffer a significant injury. There is also risk of injury involved in instances even where the user does not self-monitor the temperature by touch, since many applications include sinks and backsplash of near boiling fluid may occur.

Other conventional fluid heating devices heat water instantly to a desired temperature. However, as fluid is dispensed immediately, some fluid dispensed is at the desired temperature and some fluid is not. Thus the entire volume of fluid dispensed may not be at the same desired temperature.

SUMMARY OF THE INVENTION

In selected embodiments of the disclosure, a fluid heating system includes a fluid heating device. The fluid heating system may be installed for residential and commercial use, and may provide fluid at consistent high temperatures for cooking, sterilizing tools or utensils, hot beverages and the like, without a limit on the number of consecutive discharges of fluid. Embodiments of the tankless fluid heating device described herein, may deliver a limitless supply of fluid at a user-specified temperature (including near boiling fluid) on demand, for each demand occurring over a short period of time. Other embodiments of the fluid heating devices described herein provide that an entire volume of fluid is at the same user-defined temperature each time fluid is discharged. In select examples, the fluid heating system is efficiently and automatically operated by monitoring temperatures of the fluid throughout the fluid heating device and by detecting a possible demand of heated fluid. The monitoring of the temperatures is performed by a plurality of temperature sensors placed along the fluid path while the detection of the possible demand of heated fluid is implemented by a presence sensor and a programmable clock.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. The accompanying drawings have not necessarily been drawn to scale. In the accompanying drawings.

DETAILED DESCRIPTION OF ILLUSTRATIVE EMBODIMENTS

Figure 1:
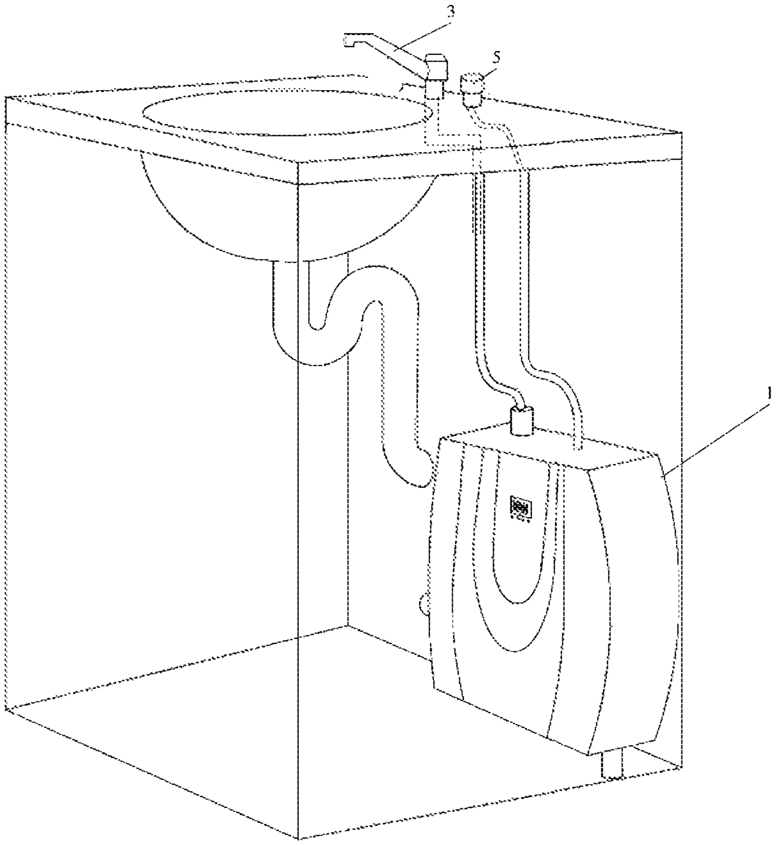
FIG. 1 illustrates a first exemplary fluid heating system.

The following description relates to a fluid heating system, and specifically a fluid heating device that repeatedly delivers fluid at the same high temperature, on demand without a large time delay. In selected embodiments, the fluid heating device does not include a tank for retaining fluid, and thus provides a more compact design which is less cumbersome to install than other fluid heating devices. The fluid heating device includes at least one heat source connected to an inlet port and a manifold. The manifold is connected to a valve manifold by an intermediate conduit, and the valve manifold is connected to an outlet port by an outlet conduit. A flow regulator and first temperature sensor are incorporated into the intermediate conduit. A flow sensor monitors a flow rate of fluid into the at least one heat source. An Electrical Control Unit (ECU) having processing and communication circuitry communicates with the at least one heat source, flow sensor, first temperature sensor, valve manifold, and an activation device. In selected embodiments, the fluid heating device may supply fluid at a desired high temperature (e.g. 200° F.) consistently even when the activation switch is operated repeatedly over a short period of time.

Referring now to the drawings, wherein like reference numerals designate identical or corresponding parts throughout the several views. It is noted that as used in the specification and the appending claims the singular forms "a," "an," and "the" can include plural references unless the context clearly dictates otherwise.

FIG. 1 illustrates a fluid heating system according to one example which is incorporated in a commercial or residential application. A fluid heating device 1 is installed under a sink and connected to a fluid supply and a fluid discharge device 3. An activation switch 5 is provided with the fluid discharge device 3 and electrically connected to a fluid heating device 1. The fluid heating device 1 is an instant heating device and may provide fluid at a consistent high temperature for cooking, sterilizing tools or utensils, hot beverages and the like, without a limit on the number of consecutive discharges of fluid.

Figure 2:
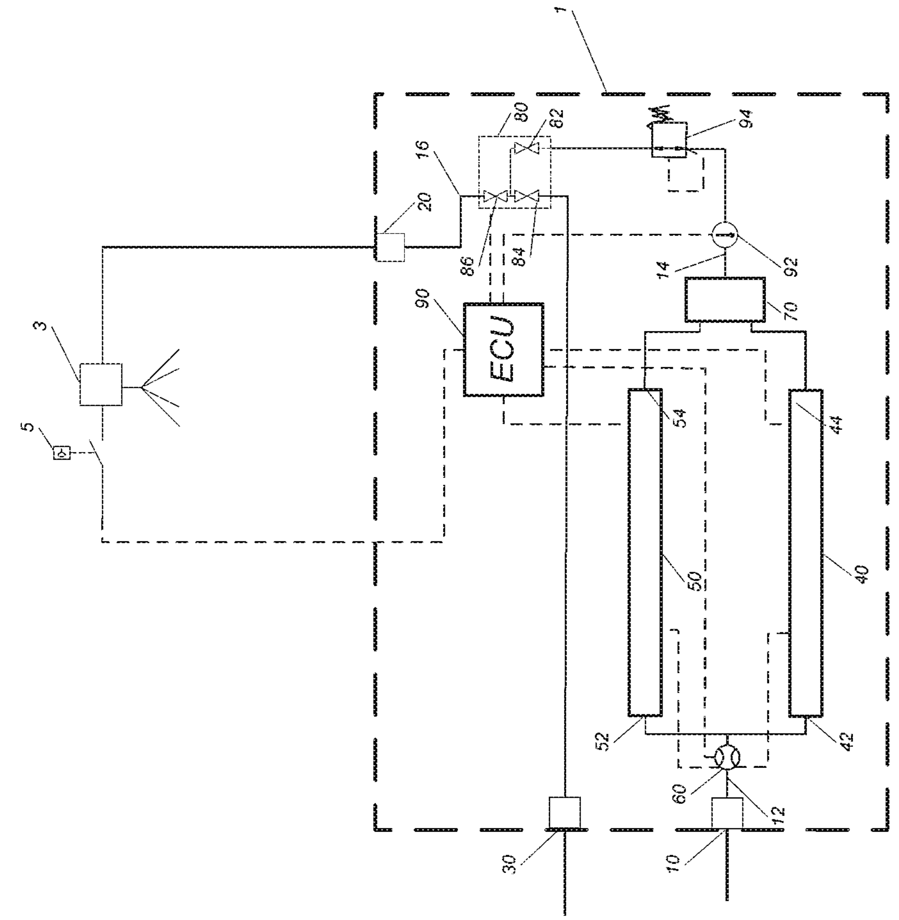
FIG. 2 schematically illustrates a fluid heating system according to one example.

FIG. 2 schematically illustrates a fluid heating system according to one example. The fluid heating system of FIG. 2 includes the fluid heating device 1, the fluid discharge 3 which could be a faucet, spigot, or other fluid dispenser, and the activation switch 5. The activation switch 5 may include a push-button, touch sensitive surface, infrared sensor, or the like. The fluid heating device 1 includes an inlet port 10, an outlet port 20, and a drain port 30. The inlet port 10 is connected to a flow sensor 60 by an inlet conduit 12. The flow sensor 60 is connected to a first heat source 40 and a second heat source 50, by a first heat source inlet 42 and second heat source inlet 52 respectively. A manifold may also be provided to connect a line extending from the flow sensor 60 to each heat source inlet. Although two heat sources are illustrated in FIG. 2, a single heat source or more than two heat sources may be provided. A manifold 70 is connected to a first heat source outlet 44 and a second heat source outlet 54, and an intermediate fluid conduit 14. A first temperature sensor 92 is installed in the intermediate fluid conduit 14. The intermediate fluid conduit 14 is connected to a regulator 94 which is connected to a valve manifold 80. The valve manifold 80 is connected by an outlet conduit 16 to the outlet port 20. The outlet port 20 is connected to the fluid discharge 3 by a conduit (not shown).

During operation, when the activation switch 5 is operated, the fluid heating device 1 can operate the first heat source 40 and the second heat source 50 to supply fluid from a fluid supply (not shown) connected to the inlet port 10, at a high temperature (e.g. 200° F. or any other temperature corresponding to just below a boiling point of a type of fluid), without a large time delay. The fluid heating system of FIG. 2 is able to heat fluid rapidly upon operation of the activation switch 5, without the need of a tank to hold the fluid supply. The fluid heating device 1 is advantageously compact and may be installed readily in existing systems, including for example a fluid dispenser for a sink within a residence, business, or kitchen. As the fluid heating device 1 does not require a fluid tank, less space is required for installation.

Figure 3:
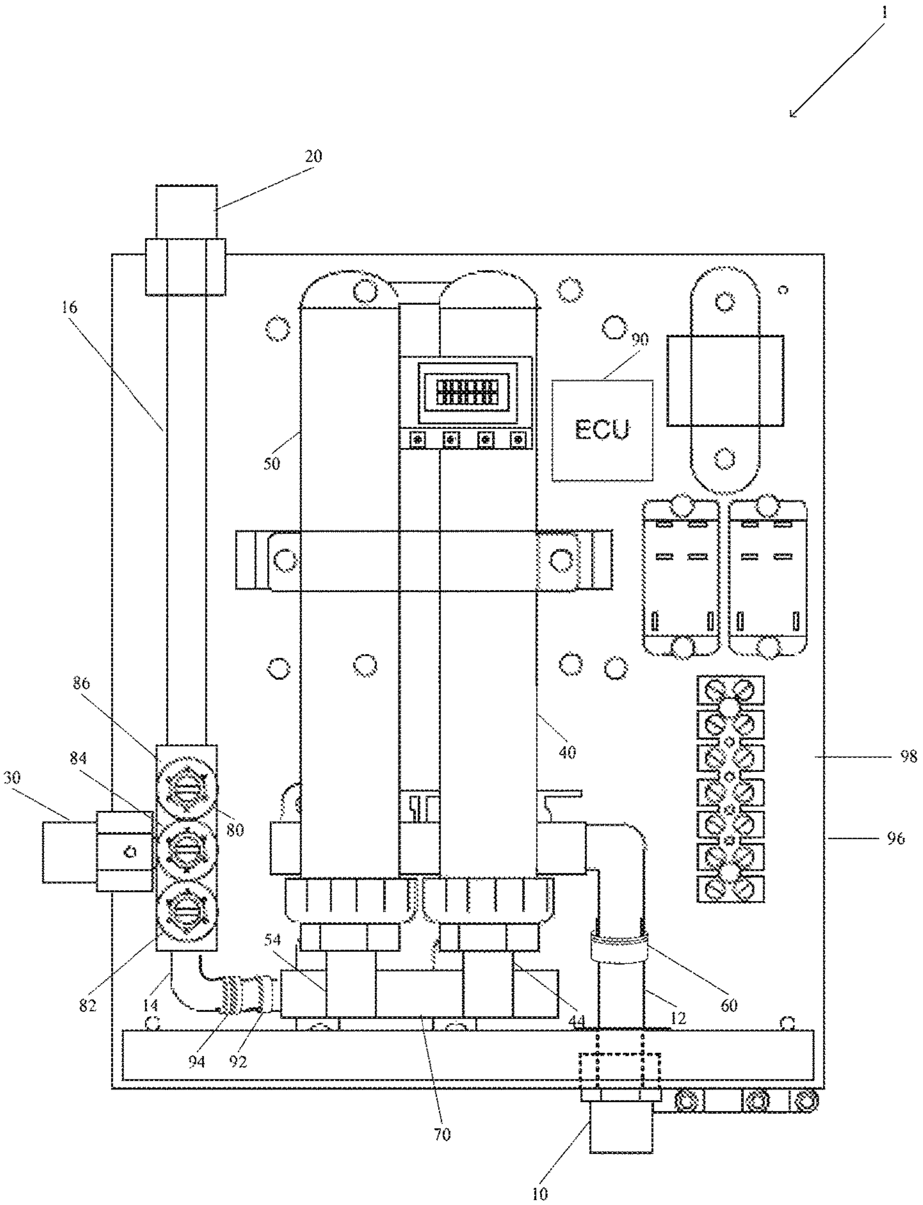
FIG. 3 illustrates a fluid heating device according to one example.

FIG. 3 illustrates the fluid heating device 1 according to the present disclosure partially enclosed in a housing 96. In FIG. 3 a front cover of the housing 96 removed. The inlet port 10 is connected to the first heat source 40 and the second heat source 50 by the inlet conduit 12. A flow rate of fluid, flowing from the inlet conduit 12 into the first heat source 40 and the second heat source 50, is detected by the flow sensor 60. The flow sensor 60 includes a flow switch (not shown) that sends a signal to the first heat source 40 and the second heat source 50 when a minimum flow rate (e.g., 0.5 gm) is detected. The flow sensor 60 may include a magnetic switch, and be installed within the inlet conduit 12. Once activated by the flow switch in the flow sensor 60, the ECU 90 regulates a power supply to the first heat source 40 and the second heat source 50 (e.g. the ECU 90 may regulate the current supplied to the heat sources by Pulse Width Modulation (PWM)). In selected embodiments, the flow sensor 60 may send a signal to the ECU 90, and in addition to regulating a present power supply, the ECU 90 may be configured to turn the first heat source 40 and the second heat source 50 on and off by providing or discontinuing the power supply.

The fluid manifold 70 is connected to the valve manifold 80 by the intermediate fluid conduit 14. The first temperature sensor 92 and the flow regulator 94 are provided within the intermediate fluid conduit 14. The first temperature sensor 92 sends a signal to the ECU 90 indicating the temperature of the fluid flowing immediately from the first heat source 40 and the second heat source 50. The flow regulator 94 may include a manually operated ball valve or a self-adjusting in-line flow regulator. In the case of the ball valve, the ball valve can be manually set to a pressure that corresponds to a given flow rate. In the case of the in-line flow regular, the in-line flow regulator adjusts depending on the flow rate of the fluid in the intermediate conduit 14, and may contain an O-ring that directly restricts flow.

The flow regulator 94 may regulate the flow rate of fluid flowing from the first heat source 40 and the second heat source 50 at a predetermined flow rate. The predetermined flow rate may correspond to the minimum flow rate at which the flow switch in the flow sensor 60 will send a signal to activate the first heat source 40 and the second heat source 50 (once the flow sensor 60 detects a flow rate equal to or greater than the minimum flow rate). An advantage of installing the flow regulator 94 in the intermediate conduit 14 is that a pressure drop in the first heat source 40 and the second heat source 50 may be avoided. Maintaining a high pressure in the heat sources reduces the chance for fluid to be vaporized, which may create pockets of steam in the heat sources during operation and cause respective heating elements in the heating sources to fail.

Fluid is conveyed from the fluid manifold 70 to the valve manifold 80 through the intermediate conduit 14, and may be directed to either the outlet port 20 or the drain port 30 by the valve manifold 80. The valve manifold 80 is connected to the outlet port 20 by a fluid outlet conduit 16. The drain port 30 may extend directly from, or be connected through an additional conduit, to the valve manifold 80. Fluid flowing in the intermediate conduit 14, or the outlet conduit 16, can be discharged from the fluid heating device 1 by the valve manifold 80.

As illustrated in FIG. 3, the fluid heating device 1 includes a housing 96. The housing 96 includes an inner wall 98. The first heat source 40, second heat source 50, valve manifold 80, and the ECU 90 are mounted onto the inner wall 98 of the housing 96. The compact arrangement of the first heat source 40 and the second heat source 50 within the housing 96, permits installation in existing systems. Further, as a result of the operation of the valve manifold 80, the fluid heating device 1 does not convey fluid below a predetermined temperature to the discharge device 3.

Figure 4:
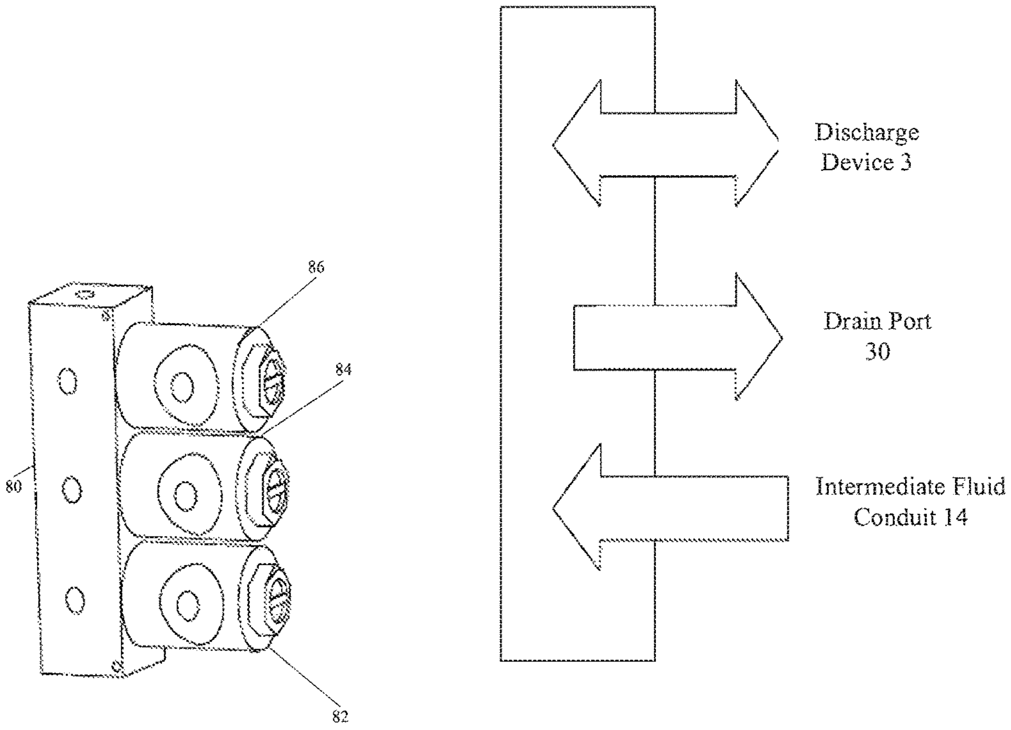
FIG. 4 illustrates a valve manifold according to one example.

FIG. 4 illustrates a valve manifold according to the selected embodiment. The valve manifold 80 includes a first valve 82, a second valve 84, and a third valve 86 which are operated by the ECU 90. The first valve 82 is connected to the fluid conduit 14, the second valve 84 is connected to the drain port 30, and the third valve 86 is connected to the outlet conduit 16. Each of the first valve 82, second valves 84, and third valve 86 may be a solenoid valve. Further, two-way or three-way solenoid valves may be provided for each valve in the valve manifold 80. Fluid in the intermediate conduit 14 or the outlet conduit 16, may be directed to the outlet port 20 or the drain port 30 by the operation of the first valve 82, second valve 84, and third valve 86 of the valve manifold 80.

As illustrated in FIG. 2 the ECU 90 communicates with the activation switch 5, the first heat source 40, the second heat source 50, flow sensor 60, the valve manifold 80, and the first temperature sensor 92. As described above, the first valve 82, second valve 84, and the third valve 86 each may be a solenoid valve operated by a signal from the ECU 90. During operation, when an activation switch 5 is operated, a signal is sent to the ECU 90 to provide high temperature fluid. The ECU 90 operates the valve manifold 80 to discharge fluid in the outlet conduit 16 to the drain port 30 and takes a reading from the flow sensor 60. Upon a determination nation that the flow rate is equal to or above the predetermined flow rate, the flow switch provided in the flow sensor 60 activates the first heat source 40 and the second heat source 50. The ECU 90 receives the signal from the flow sensor 60, and controls the power supply to the first heat source 40 and the second heat source 50, and operates the valve manifold 80 in accordance with the temperature detected by the first temperature sensor 92.

When the flow sensor 60 detects the flow rate is above the predetermined flow rate. e.g. 0.5 gpm (US gallon per minute), and a temperature detected by the first sensor 92 is below a predetermined temperature, the control 90 operates the valve manifold 80 to discharge fluid from the fluid conduit 14 through the drain port 30. In order for fluid to reach the predetermined temperature, the ECU 90 may use the reading from the first temperature sensor 92 to determine the amount of power to be supplied to the first heat source 40 and the second heat source 50. The ECU 90 opens the first valve 82 and the second valve 84, and closes the third valve 86 to discharge fluid from the fluid heating device 1 to the drain port 30. When the temperature detected by the temperature sensor 92 is above the predetermined temperature, the control unit 90 operates the valve manifold 80 to discharge fluid through the outlet port 20. The ECU 90 opens the first valve 82 and the third valve 86, and closes the second valve 84, to discharge fluid from the fluid heating device 1 to the fluid discharge device 3 through the outlet port 20. A valve (not shown) may be provided in the discharge device 3 to dispense the fluid supplied through the outlet port 20. The discharge device 3 may also include a dual motion sensor for dispensing fluid after a dual motion is detected.

During an operation in which the valve manifold 80 discharges fluid from the outlet conduit 16 to the drain port 30, the ECU 90 operates the valve manifold 80 to close the first valve 82, and open the third valve 86 and the second valve 84. During an operation in which the first sensor 92 detects the temperature in the intermediate conduit 14 is less than the predetermined temperature, the ECU 90 operates the valve manifold 80 to open the first valve 82 and the second valve 84, and close the third valve 86, to discharge fluid in the intermediate conduit 14 through the drain port 30. The drain port 30 may be connected to a conduit connected to the inlet port 10 or the inlet conduit 12, in order to recirculate fluid that is not yet above the predetermined temperature back into the fluid heating device 1 to be heated again and delivered to the fluid discharge device 3.

In the selected embodiments, the ECU 90 may incorporate the time between operations of the activation switch 5 to either forego draining fluid from the outlet conduit 16 to the drain port 30, or allow the valve manifold 80 to drain the fluid from the outlet conduit 16 automatically without an operation of the activation switch 5. In the first case, when the ECU 90 determines a period of time between operating the activation switch 5 is below a predetermined time limit, the valve manifold 80 will not drain the fluid in the outlet conduit 16 to the drain port 30. The fluid in the outlet conduit 16 would then be supplied to the discharge device 3. This would only occur in situations where the temperature of the fluid in the intermediate conduit 14 is at the predetermined temperature, and the first valve 82 and the third valve 86 of the valve manifold 80 are opened by the ECU 90. This may be advantageous in situations where the switch is operated many times consecutively. Since the valve manifold 80 is operated fewer times, the overall efficiency of the fluid heating device 1 over a period of time increases with an increase in the frequency of consecutive operations. In the other case, the ECU 90 may determine a pre-set time has elapsed since a previous operation of the activation switch 5. The ECU 90 will operate the valve manifold 80 automatically to open the second valve 84 and the third valve 86 at the end of the pre-set time, to drain the fluid in the outlet conduit 16 to the drain port 30.

The ECU 90 may include an adjuster (such as potentiometer, a rheostat, an encoder switch, or momentary switches/jumpers, or the like) to control a set point, and input/outputs (I/O) for each of sending a signal to a solid state switch triode for alternating current (TRIAC) (a solid state switch that controls heat sources and turns them on and off), reading the signal from the flow sensor 60, and reading the first temperature sensor 92. The ECU 90 may include an (I/O) for each of the first, second, and third valves of the valve manifold 80. The ECU 90 may incorporate Pulse Width Modulation (PWM), Pulse Density Modulation (PDM), Phase Control or combination of the previous three methods and Proportional Integral Derivative (PID) control to manage power to the first and second heat sources (40, 50). The ECU 90 may read a set point for the predetermined temperature and the temperature detected by the first temperature sensor 92 and choose a power level based a deviation between the temperatures. To achieve the set point, the PID control loop may be implemented with the PWM loop, Pulse Density Modulation (PDM), Phase Control or a combination of the previous three methods.

Regarding the activation switch 5 as illustrated in FIG. 1, in selected embodiments the activation switch 5 directly initiates the operation of the valve manifold 80 as a safety measure. This ensures that when one of the valves in the valve manifold fails, a system failure further damaging the fluid heating device 1 will not occur. Further safety measures can be provided in order to prevent the instant discharge of hot fluid when a user inadvertently operates the activation switch 5 or is unaware of the result of operation (such with a small child). Such safety mechanisms can include a time delay or a requirement that the activation switch 5 be operated, i.e., pressed, for a predetermined amount of time. The activation switch 5 may also include a dual motion sensor for initiating the operation of the fluid heating device 1. These safety mechanisms may prevent small children from activating the hot water and putting themselves in danger by touching the activation switch 5 briefly.

One advantage of the fluid heating system of FIG. 1 is the minimal standby power that is required to power the fluid heating device 1 in a standby mode of operation. Specifically, the power required is minimal (e.g. 0.3 watts) to monitor sensors, a system on/off button, and control the valves (82, 84, 86) in the valve manifold 80. Further, the valves may be solenoid valves which are arranged so that they will be in a non-powered state during periods when the fluid heating device is in standby mode. The minimal standby power provides another advantage over conventional fluid heating devices which are not used frequently. In an example where a single volume of fluid is dispensed over a period of time such as 24 hours, the fluid heating device 1 may use a minimal amount of power (e.g. 24-36 Id), even though power is used to drain and/or partially heat and drain fluid in the fluid heating system before supplying to the fluid discharge device 3. On the other hand, conventional fluid heating devices may use an amount of power over the same period which is substantial greater (e.g. 2000 kJ).

Figure 5:
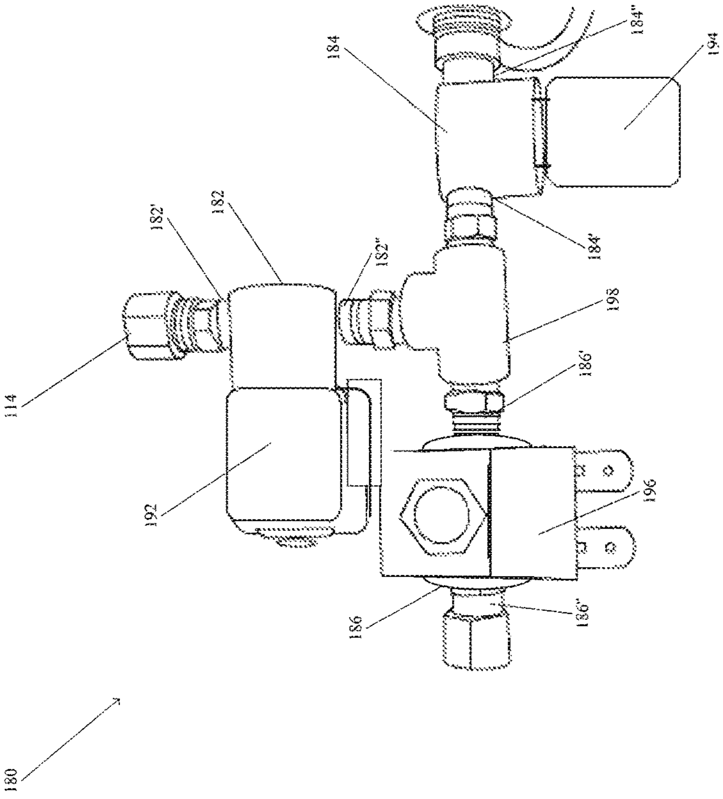
FIG. 5 illustrates a valve manifold according to one example.

FIG. 5 illustrates a valve manifold 180 in which the valves are individually piped together. As illustrated in FIG. 4, a first valve 182 includes a first port 182' connected to a fluid conduit 114, and a second port 182" that is connected to a T-fitting 198. The first valve is actuated to open and close by a first actuator 192. A second valve 184 includes a first port 184' connected to the T-fitting 198, and a second port 184" that is connected to a drain port (not shown). The second valve 184 is actuated to open and close by a second actuator 194. A third valve 186 includes a first port 186' connected to the T-fitting 198, and a second port 186" connected to an outlet port (not shown). The third valve 186 is actuated to open and close by a third actuator 196. In another selected embodiment, the first valve 182 may be installed upstream of the second valve 184 and the third valve 186.

Figure 6:
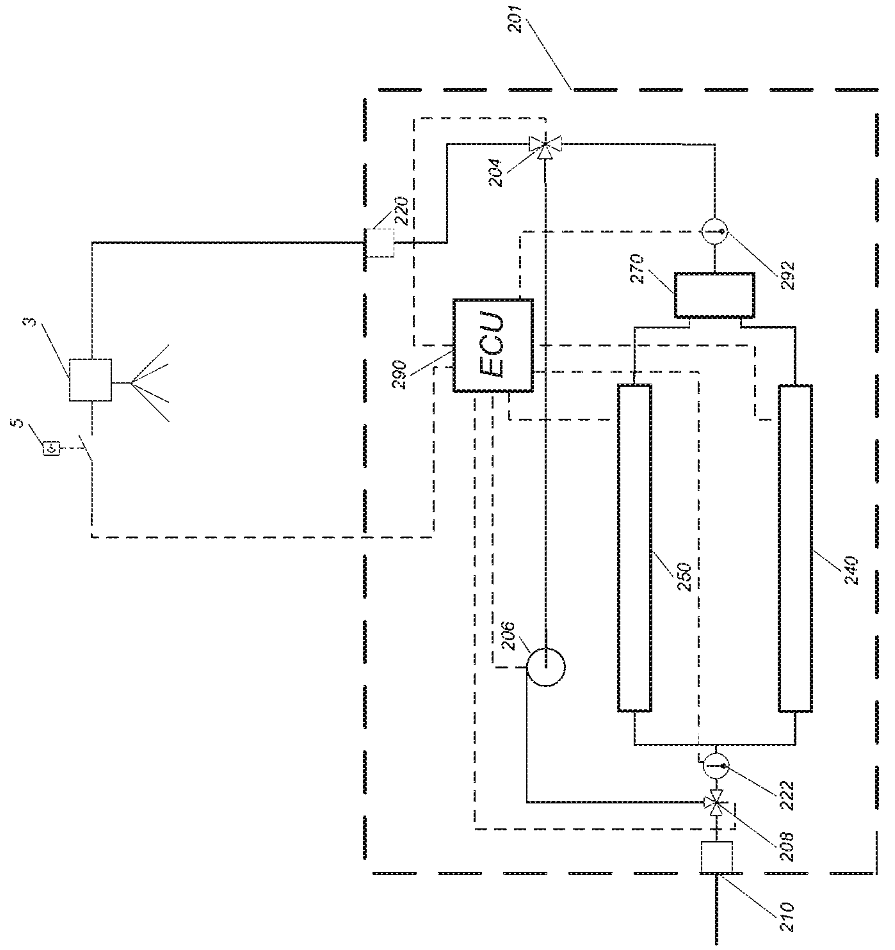
FIG. 6 schematically illustrates a fluid heating system according to one example.

FIG. 6 illustrates a fluid heating system according to another selected embodiment. In the fluid heating system illustrated in FIG. 6, a fluid heating device 201 is provided. Many of the advantages described with respect to other selected embodiments described herein, are provided by the fluid heating system of FIG. 6. The fluid heating device 201 includes an inlet port 210, an outlet port 220, a first heat source 240, a second heat source 250, a manifold 270, and a ECU 290. In addition, a first control valve 204 and a pump 206 are downstream of the first temperature sensor 292, and second control valve 208 and a second temperature sensor 222 are provided upstream of the first heat source 240 and the second heat source 250. The pump 206 is connected to the second control valve 208.

Each of the first control valve 204 and the second control valve 208 is a 3-way solenoid valve, in a de-energized state, the first control valve 204 and second control valve 208 direct fluid from the inlet port 210 to the outlet port 220. In an energized state the first control valve 204 and second control valve 208 direct fluid from the manifold to the pump 206. The pump 206, supplied with power by the ECU 290, circulates the fluid through a closed loop including the first heat source 240 and the second heat source 250.

During operation, when the discharge device 3 is operated, the first temperature sensor 292 sends a signal indicating the temperature of fluid in the fluid heating device 201 downstream of the manifold 270. If the temperature of the fluid in the fluid heating device 201, which may result from recent operation where the fluid discharge device 3 dispensed fluid at specific temperature, is at a desired temperature, the ECU 290 will supply power to the first heat source 240 and the second heat source 250. The ECU 290 will operate the first control valve 204 and the second control valve 208 to be in a de-energized state, and fluid will flow from the inlet port 210, through the heat sources, to the outlet port 220 and the discharge device 3.

In the fluid heating system of FIG. 6, when the fluid discharge device 3 is operated and the temperature detected by the first temperature sensor 292 is below a desired temperature, the first control valve 204 is energized and directs fluid to the pump 206, which is activated by the ECU 290. The pump 206 conveys the fluid to the second control valve 208, which is in an energized state to provide the closed loop fluid path and direct fluid back through the first heat source 240 and the second heat source 250. The ECU 290 will activate the first heat source 240 and the second heat source 250, as the fluid flows in the closed loop configuration provided by the first control valve 204 and the second control valve 208. The ECU 290 will use readings from the second temperature sensor 222 to control the power supply to the first heat source 240 and the second heat source 250. When the first temperature sensor 292 detects the temperature of the fluid is at the desired temperature, the ECU 290 operates at least the control valves (204, 208) to be in a de-energized state and stops a power supply to the pump 206. As a result, fluid is directed from the manifold 270 to the outlet port 220 by the first control valve 204 in the de-energized state. The ECU 290 may incorporate a preset time delay between the first time the first temperature sensor 292 detects the fluid is at the desired temperature, and an end of the time delay. The ECU 290 may wait for the time delay period to elapse before operating the fluid heating device 201 to deliver fluid to the fluid discharge device 3 by de-energizing the control valves (204, 208), and stopping power supply to the pump 206. The time delay may be preset or determined by the ECU 290 based on the temperature readings of the first temperature sensor 292 and the second temperature sensor 222.

Figure 7:
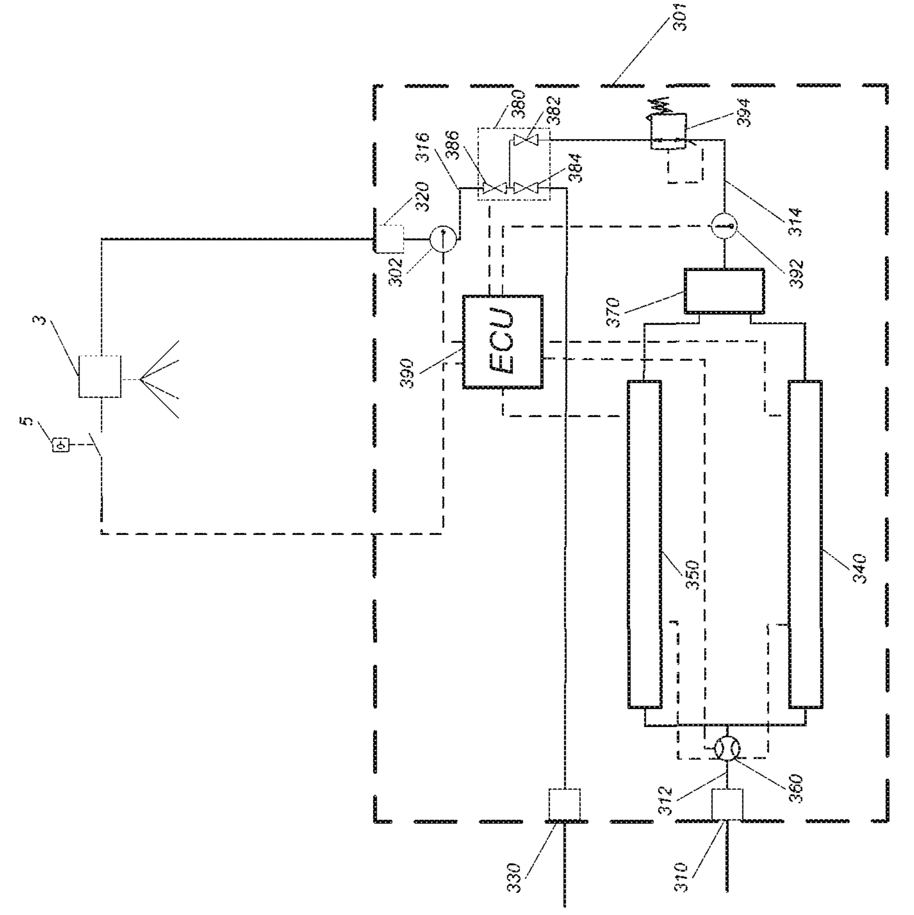
FIG. 7 schematically illustrates a fluid heating system according to one example.

FIG. 7 illustrates a fluid heating system according to another selected embodiment. In the fluid heating system illustrated in FIG. 7, a fluid heating device 301 is provided. Similar to the fluid heating device of FIG. 1, the fluid heating device 301 of FIG. 7 includes an inlet port 310, an outlet port 320, a first heat source 340, a second heat source 350, a flow sensor 360, a manifold 370, a valve manifold 380, a first temperature sensor 392, a flow regulator 394, and a ECU 390. In addition, the fluid heating device 301 is provided with a second temperature sensor 302 downstream of the valve manifold 380. The second temperature sensor 302 is provided within an outlet conduit 316 in the fluid heating device 301. The second temperature sensor 302 sends a signal to the ECU 390 indicating the temperature of the fluid in the outlet conduit 316.

The fluid heating device 301 can be operated in two main modes by the ECU 390. In a first mode, the fluid heating device 301 operates in the same manner as the fluid heating device 101 illustrated in FIG. 1. When the activation switch 5 is operated, the ECU 390 operates the valve manifold 380 to discharge fluid in outlet conduit 316 automatically to the drain port. After the fluid in the outlet conduit 316 is discharged, and the flow sensor 360 detects fluid flow at a predetermined flow rate, the first heat source 340, second heat source 350, and valve manifold 380 are operated by the ECU 390 in accordance with the temperature detected by the first temperature sensor 392.

In a second mode of operation, the control unit 390 takes a reading from the second temperature sensor 302 when the activation switch 5 is operated. The ECU operates the valve manifold 380 to discharge fluid from the outlet conduit 316 when the second temperature sensor 302 detects a temperature of the fluid in the outlet conduit 316 is below a predetermined temperature. In addition, when the temperature of the fluid in the outlet conduit 316 is above the predetermined temperature, or the outlet conduit 316 has been emptied through the drain port 330, and the temperature of the fluid in the fluid conduit 314 is above the predetermined temperature, the control unit 390 operates the valve manifold 380 to discharge fluid through the outlet port 320. The ECU 390 opens a first valve 382 and a third valve 386, and closes a second valve 384 of the valve manifold 380 to discharge fluid from the fluid heating device 301 to the fluid discharge device 3.

When the temperature of the fluid in the outlet conduit 316 is above the predetermined temperature when the activation switch 5 is operated, the fluid heating device 301 supplies the fluid to the fluid discharge device 3 immediately. When fluid in the outlet conduit 316 is below the predetermined temperature, there is a time delay adequate to drain fluid from the outlet conduit 316 through the drain port 330 before the discharge device 3 discharges fluid. When the fluid in the heating device 301 upstream of the valve manifold 380 (in the intermediate conduit 314) is below the predetermined temperature, another time delay occurs after the activation switch 5 is operated in order for the fluid to be heated to a temperature that is equal to the predetermined temperature. It is noted that both operations using the drain port 330 may be required to be carried out before the fluid heating device 301 discharges fluid to the fluid discharge device 3.

Figure 8:
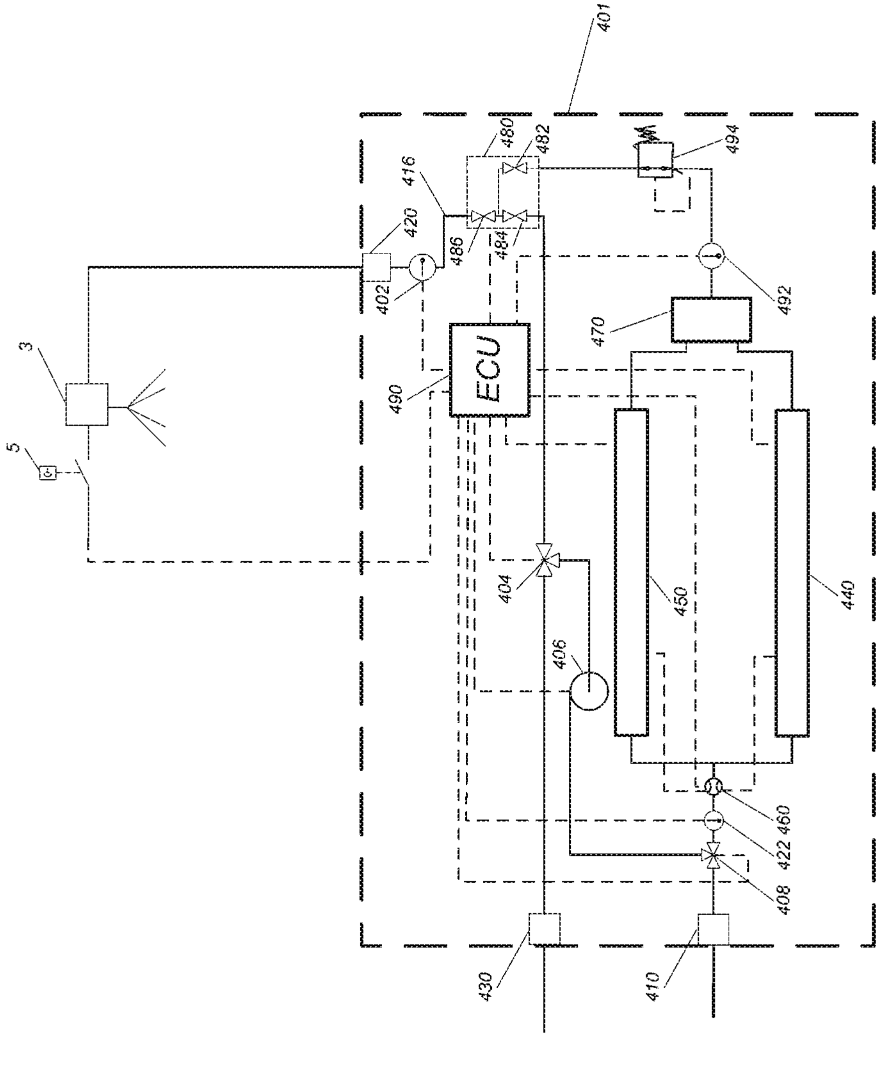
FIG. 8 schematically illustrates a fluid heating system according to one example.

FIG. 8 illustrates a fluid heating system according to another selected embodiment. In the fluid heating system illustrated in FIG. 8, a fluid heating device 401 is provided and includes an inlet port 410, an outlet port 420, a drain port 430, a first heat source 440, a second heat source 450, a flow sensor 460, a manifold 470, a valve manifold 480, a first temperature sensor 492, a flow regulator 494, and a ECU 490. The valve manifold 480 includes a first valve 482 downstream of the regulator 494, a second valve 484, and a third valve 486. In addition, the fluid heating device 401 includes a second temperature sensor 402 connected to the third valve 486, and a first control valve 404 connected to the second valve 484 of the valve manifold 480. The first control valve 404 is connected to the drain port 430, and an inlet of a pump 406. An outlet of the pump 406 is connected to a second control valve 408 which is downstream of the inlet port 410, and upstream of a third temperature sensor 422. The flow sensor 460 is downstream of the third temperature sensor 422.

In a first mode of operation the first control valve 404 and the valve manifold 480 are operated to provide a fluid pathway between the valve manifold 480 and the drain port 430. The ECU 490 may operate the fluid heating device 401 in one of two sub-modes which are the same as the two modes of operation described above with respect to the fluid heating device 301 of FIG. 8. In one sub-mode the ECU 490 automatically operates the valve manifold 480 to direct fluid from an outlet conduit 416 to the drain port 430 when the activation switch 5 is operated. In the other sub-mode, the ECU 490 takes a reading from the second temperature sensor 402 before draining the outlet conduit 416.

In a second mode of operation the valve manifold 480, first control valve 404, and second control valve 408 are operated to provide a closed loop fluid path. In this mode of operation, the valve manifold 480 and the first control valve 404 direct fluid to the pump 406, which is activated by the ECU 490. The pump 406 conveys the fluid to the second control valve 408, which is operated to direct fluid back through the first heat source 440 and the second heat source 450. The ECU 490 will activate the heat sources (440, 450) as fluid flows in the closed loop configuration, and take readings from the third temperature sensor 422 to control the power supply to the heat sources (440, 450). When the first temperature sensor 492 detects the temperature of the fluid is at the desired temperature, the ECU 490 operates the valve manifold 470 and the control valves (404, 408) to direct fluid to the outlet port 420, and stops the power supply to the pump 406. As in the fluid heating device 201 of FIG. 6, the ECU 490 may wait for a time delay period to elapse after the fluid is detected to be at a desired temperature, before operating the fluid heating device 401 to deliver fluid to the fluid discharge device 403. The time delay may be preset, or determined by the ECU 490 based on the temperature readings of the first temperature sensor 492 and the third temperature sensor 408.

Figure 9:
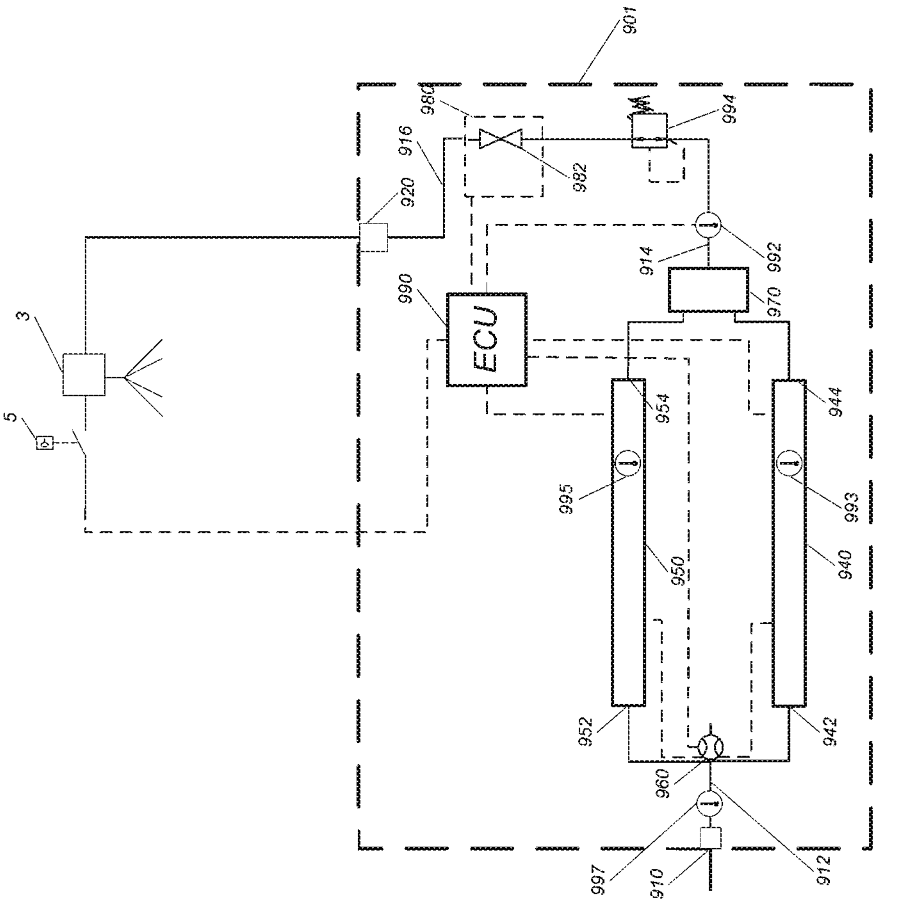
FIG. 9 schematically illustrates a fluid heating system according to one example.

FIG. 9 schematically illustrates a fluid heating system according to another example. The fluid heating system of FIG. 9 includes the fluid heating device 901, the fluid discharge 3 which could be a faucet, spigot, or other fluid dispenser, and the activation switch 5, which may include a push-button, touch sensitive surface, infrared sensor, or the like, as described herein. The fluid heating device 901 includes an inlet port 910 and an outlet port 920. The inlet port 910 is connected to a flow sensor 960 by an inlet conduit 912. The flow sensor 960 is connected to a first heat source 940 and a second heat source 950, by a first heat source inlet 942 and second heat source inlet 952 respectively. An inlet manifold (not shown) may also be provided to connect a line extending from the flow sensor 960 to each heat source inlet. Although two heat sources are illustrated in FIG. 9, a single heat source or more than two heat sources may be provided. A manifold 970 is connected to a first heat source outlet 944 and a second heat source outlet 954, and an intermediate fluid conduit 914. A first temperature sensor 992 is installed in the intermediate fluid conduit 914. A second temperature sensor 993 and a third temperature sensor 995 are installed in the first heat source 940 and second heat source 950 respectively. A fourth temperature sensor 997 is installed in the inlet conduit 912. The intermediate fluid conduit 914 is connected to a regulator 994 which is connected to a valve manifold 980. The valve manifold 980 is connected by an outlet conduit 916 to the outlet port 920. The outlet port 920 is connected to the fluid discharge 3 by a fluid conduit. In addition, the fluid heating device 901 includes an ECU operating the valve manifold 980, the first heat source 940, and the second heat source 950.

During operation, when the activation switch 5 is operated, the fluid heating device 901 can operate the first heat source 940 and the second heat source 950 to supply fluid from a fluid supply (not shown) connected to the inlet port 910, at a high temperature (e.g. 200° F. or any other temperature corresponding to just below a boiling point of a type of fluid), without a large time delay. The first heat source 940 and the second heat source 950 can include heating by activating bare wire elements as described in at least one of U.S. Pat. No. 7,567,751 B2 and in U.S. patent application Ser. No. 13,943,495, each of which is herein incorporated by reference. The fluid heating system of FIG. 9 is able to heat fluid rapidly upon operation of the activation switch 5, without the need of a tank to hold the fluid supply. The fluid heating device 901 is advantageously compact and may be installed readily in existing systems, including for example a fluid dispenser for a sink within a residence, business, or kitchen. As the fluid heating device 901 does not require a fluid tank, less space is required for installation.

Figure 10:
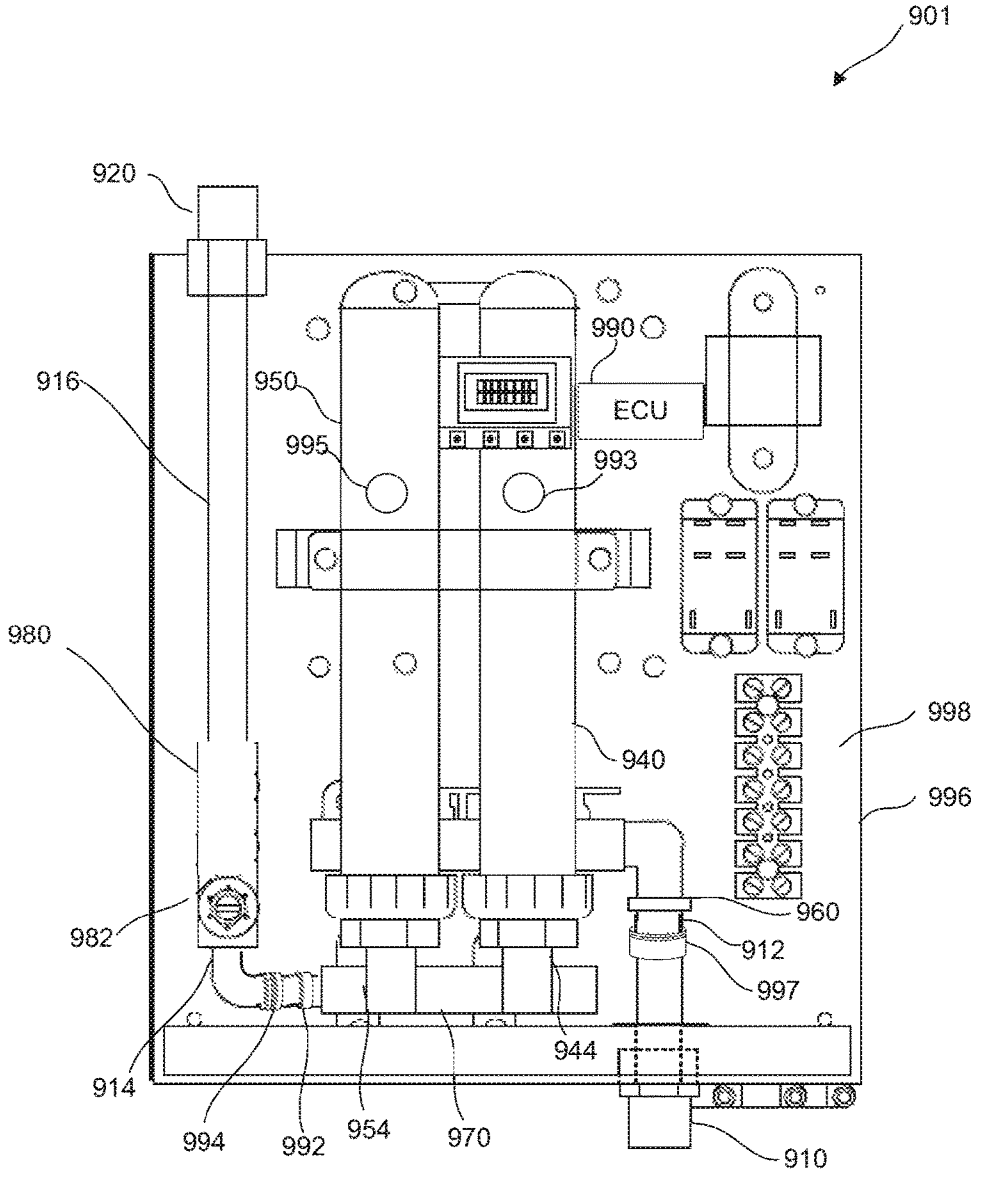
FIG. 10 schematically illustrates a fluid heating system according to one example.

FIG. 10 illustrates the fluid heating device 901 according to the present disclosure partially enclosed in a housing 996. In FIG. 10 a front cover of the housing 996 removed. The inlet port 910 is connected to the first heat source 940, with the second temperature sensor 993, and the second heat source 950, with the third temperature sensor 995, by the inlet conduit 912. A flow rate of fluid, flowing from the inlet conduit 912 into the first heat source 940 and the second heat source 950, is detected by the flow sensor 960. The flow sensor 960 includes a flow switch (not shown) that sends a signal to the first heat source 940 and the second heat source 950 when a minimum flow rate (e.g. 0.5 gm) is detected. The flow sensor 960 may include a magnetic switch, and can be installed within the inlet conduit 912. Once activated by the flow switch in the flow sensor 960 and upon receiving the signal, the ECU 990 regulates a power supply to the first heat source 940 and the second heat source 950 (e.g. the ECU 990 may activate the current supplied to the heat sources by Pulse Width Modulation (PWM)). In selected embodiments, the flow sensor 960 may send a signal to the ECU 990, and in addition to activating a present power supply, the ECU 990 may be configured to turn the first heat source 940 and the second heat source 950 on and off by providing or discontinuing the power supply.

The fluid manifold 970 is connected to the valve manifold 980 by the intermediate fluid conduit 914. The first temperature sensor 992 and the flow regulator 994 are provided within the intermediate fluid conduit 914. The first temperature sensor 992 sends a signal to the ECU 990 indicating the temperature of the fluid flowing immediately from the first heat source 940 and/or the second heat source 950. The flow regulator 994 may include a manually operated ball valve or a self-adjusting in-line flow regulator. In the case of the ball valve, the ball valve can be manually set to a pressure that corresponds to a given flow rate. In the case of the in-line flow regular, the in-line flow regulator adjusts depending on the flow rate of the fluid in the intermediate conduit 914, and may contain an O-ring that directly restricts flow.

The flow regulator 994 may regulate the flow rate of fluid flowing from the first heat source 940 and the second heat source 950 at a predetermined flow rate. The predetermined flow rate may correspond to the minimum flow rate at which the flow switch in the flow sensor 960 will send a signal to activate the first heat source 940 and the second heat source 950 (once the flow sensor 960 detects a flow rate equal to or greater than the minimum flow rate). An advantage of installing the flow regulator 994 in the intermediate conduit 914 is that a pressure drop in the first heat source 940 and the second heat source 950 may be avoided. Maintaining a high pressure in the heat sources reduces the chance for fluid to be vaporized, which may create pockets of steam the heat sources during operation and cause respective heating elements in the heating sources to fail.

In addition, the predetermined flow rate may also correspond to a maximum flow rate at which the heat sources 940 & 950 provide a sufficient temperature rise and a useful flow of heated fluid, e.g. steady flow of water of at least 180° F.

For example, the maximum flow rate may be around 0.55 gpm for a power rating of the heat sources 940 & 950 around 12 kW (6 Kw for 940 and 6 kW for 950) and for a temperature rise between the inlet port 910 and the outlet port 920 around 147° F. The maximum flow rate may be determined by the following equation:

$$\textit{Maximumflow}\ \text{rate(gpm)} = \frac{\text{power rating(kW)} \times 6.83}{\text{rise in } \textit{temp}(^\circ\ \text{F.})}$$

Assuming that 33° F. is the coolest liquid water that would flow through the unit, the flow restrictor would be sized for 0.55 gpm. The additional benefit of sizing the flow restrictor for this situation allows for maximum flow rate while maintaining the quality of the hot water.

Fluid is conveyed from the fluid manifold 970 to the valve manifold 980 through the intermediate conduit 914 and the flow regulator 994, and may be directed to the outlet port 920 by the valve manifold 980, subject to the flow regulator 994 and a signal from the ECU 990. The valve manifold 980 is connected to the outlet port 920 by a fluid outlet conduit 916. Fluid flowing in the intermediate conduit 914, or the outlet conduit 916, can be discharged from the fluid heating device 901 by the valve manifold 980.

As illustrated in FIG. 10, the fluid heating device 901 includes a housing 996. The housing 996 includes an inner wall 998. The first heat source 940, second heat source 950, valve manifold 980, and the ECU 990 can be mounted onto the inner wall 998 of the housing 996. The compact arrangement of the first heat source 940 and the second heat source 950 within the housing 998 permits installation in existing systems, e.g., fluid dispenser for a sink within a residence, business, or kitchen.

Further, as a result of the ECU 990 operating the valve manifold 580, the first heat source 940, and second heat source 950, the fluid heating device 901 does not convey fluid below a predetermined temperature to the discharge device 3. The ECU 990 compares the temperature of the fluid from a signal provided by the first temperature sensor 992, the second temperature sensor 993, the third temperature sensor 995, the fourth temperature sensor 997 or a combination thereof, with a preset or predetermined temperature.

Figure 11:
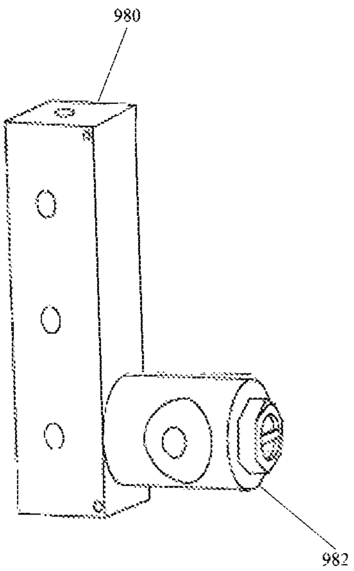
FIG. 11 schematically illustrates a valve manifold according to one example.
Figure 11:
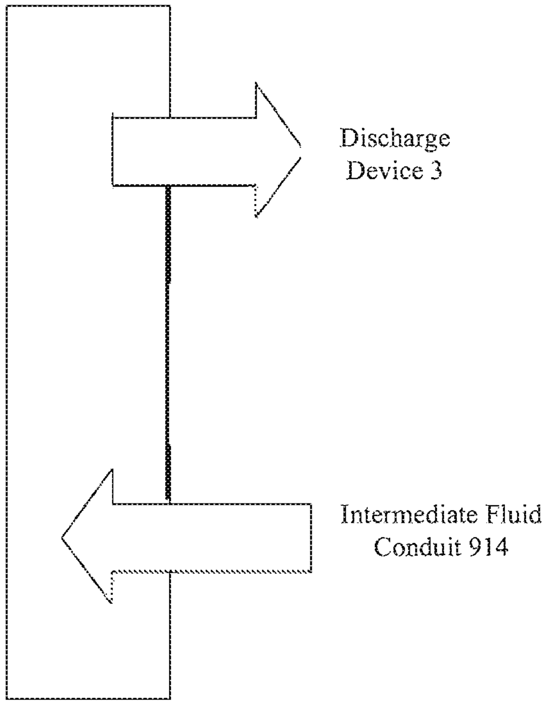

FIG. 11 illustrates the valve manifold 980 according to one example. The valve manifold 980 includes a first valve 982, which is operated by the ECU 990. The inlet of the first valve 982 is connected to the fluid conduit 914 while the outlet of the first valve 982 is connected to the outlet conduit 16. The first valve 982 may be a solenoid valve. Fluid in the intermediate conduit 914 or the outlet conduit 916, may be held or directed to the outlet port by the operation of the first valve 982 of the valve manifold 980. Alternatively, the valve manifold 980 and the first valve 982 may be replaced by a single valve.

As illustrated in FIG. 9, the ECU 990 communicates with the activation switch 5, the first heat source 940, the second heat source 950, flow sensor 960, the valve manifold 980, the first temperature sensor 992, the second temperature 993, the third temperature sensor 995 and the fourth temperature sensor 997. As described above, the first valve 982 may be a solenoid valve operated by a signal from the ECU 990. During operation, when an activation of the switch 5 is operated, the flow sensor 960 sends a signal to the ECU 990 to provide high temperature fluid.

The ECU 990 operates the valve manifold 980 to hold fluid in the outlet conduit 916. Upon a determination that the fluid temperature is less than a predetermined temperature through a reading of at least one of the first temperature sensor 992, the second temperature sensor 993, the third temperature sensor 995 and the fourth temperature sensor 997, the ECU 990 activates the first heat source 940 and the second heat source 950. The ECU 990 receives the signal from the activation switch 5 and controls the power supply to the first heat source 940 and the second heat source 950, and operates the valve manifold 980 in accordance with the temperature detected by at least one of the first temperature sensor 992, the second temperature sensor 993, and the third temperature sensor 995.

In order for fluid to reach the predetermined temperature and to determine the amount of power to be supplied to the first heat source 940 and the second heat source 950, the ECU 990 may also use readings of fluid temperature from the fourth temperature sensor 997 and/or readings of fluid flow rate from the flow sensor 960, in addition to or instead of the readings from at least one of the first temperature sensor 992, the second temperature sensor 993, the third temperature sensor 995. When the temperature detected by the second temperature sensor 993 and/or third temperature sensor 995 is above the predetermined temperature, the control unit 990 operates the valve manifold 980 to discharge fluid through the outlet port 920. The ECU 990 opens the valve 982 to discharge fluid from the fluid heating device 901 to the fluid discharge device 3 through the outlet port 920 as a function of the readings of the first temperature sensor 992, the second temperature sensor 993, the third temperature sensor 995, or a combination thereof. A valve (not shown) may be provided in the discharge device 3 to dispense the fluid supplied through the outlet port 920. When the fluid flow begins the flow sensor 960 verifies that the flow rate is above a predetermined flow rate, e.g. 0.5 gpm, and sends a signal to the ECU 990. The ECU 990 uses this signal along with readings from the first temperature sensor 992, the second temperature sensor 993, the third temperature sensor 995, the fourth temperature sensor 997, or combination thereof to determine the amount of power to continue heating the fluid as it flows.

The first temperature sensor 992, the second temperature sensor 993, the third temperature sensor 995, and the fourth temperature sensor 997 provide temperature readings along the path of the fluid through the fluid heating device 901. Such temperature readings of the fluid enable to more precisely and more efficiently operate the fluid heating device 901. For example, having readings of fluid temperature upstream from the heat sources 940 and 950, as provided by the fourth temperature sensor 997, and readings of the fluid temperature downstream from the heat sources 940 and 950, as provided by the first temperature sensor 992, may be used to precisely determine an amount of heat that needs to be produced by the heat sources 940 and 950. In addition, the readings of the fluid temperature inside the heat sources 940 and 950, as provided by the second temperature sensor 993 and the third temperature sensor 995, respectively, may be used to verify that the needed amount of heat is efficiently produced by the heat sources 940 and 950.

In addition to the readings from the first temperature sensor 992, the second temperature sensor 993, the third temperature sensor 995, the ECU 990 may read an inlet temperature and an inlet temperature variation of the fluid from a signal provided by the fourth temperature sensor 997. The ECU 990 may use the inlet temperature and the inlet temperature variation in combination with the preset temperature to determine a desired temperature rise. Then the ECU 990 uses the desired temperature rise and the flow rate provided by the flow sensor 960 to determine an amount of power to be supplied to the first heat source 940 and the second heat source 950.

For example, to determine the amount of power or load to supply to the first heat sources 940 & 950, the ECU 990 may use the following relationship between the desired temperature rise and the flow rate:

$$\text{power needed(kW)} = \frac{\text{flow rate(gpm)} \times \text{desired temperature rise(° F.)}}{6.83}$$

-continued $$\text{load \%} = \frac{\text{power needed(kW)}}{\text{total power rating(kW)}}$$

The outlet port 920 of the fluid heating device 901 may be placed at a predetermined distance from the discharge device 3. This predetermined distance may be determined such that the fluid conduit between the outlet port 920 and the discharge 3 contains a sufficiently small volume of unheated fluid, e.g. fluid at room temperature $T_{conduit}$, to not substantially change the temperature $T_{20}$ of the fluid exiting from the outlet port 920. For example, if the predetermined distance corresponds to a volume of unheated fluid of 1 fl. Oz and the volume of fluid to be dispensed is 8 fl. Oz the resultant temperature of the fluid dispensed can be described as follows:

$$T_{resultant} = \frac{[(1\text{ fl. Oz.})(T_{conduit}) + (7\text{ fl. Oz.})(T_{20})]}{8\text{ fl. Oz.}}$$

If $T_{20}$ is assumed to be an average of 200° F. and $T_{conduit}$ is assumed to be an average of 68° F. then $T_{resultant}$ will be 183.15° F. This temperature is sufficient for most intended uses of near boiling water, i.e. sanitation, hot chocolate, steeping tea, instant coffee, etc. In other words, such a volume will result in a temperature decrease of less than 20% if a total volume of 8 fl. oz. is to be dispensed at an average temperature of 200° F. Similarly, a length of the fluid conduit 916 between the outlet port 920 and the valve 982 may be minimized to limit the heat loss due to mixing with the unheated fluid that may be contained in the fluid conduit 916.

Conduit lines between the heat sources 940 & 950 and the dispensing point 3, may also be constructed of materials with good thermal conductivity, such as copper alloys or stainless steel alloys, for transferring heat from the heat sources 940 & 950 to the dispensing point 3 even when the fluid is not flowing inside the heating device 901. Such a feature maintains the heat of the fluid inside the conduit lines and minimizes the temperature loss during a first draw of the fluid. The conduit lines may also be insulated by a thermal insulating materials, such as foams or a fiberglass fabrics, to prevent losses to the environment and increase the performance and efficiency of the heating device 901.

Further, the ECU 990 may operate the valve 982 based on temperature readings from the first temperature sensor 992 to compensate for the decrease in fluid temperature due to the unheated fluid contained in the fluid conduit between the outlet port 920 and the discharge 3, or any other part of the fluid heating device 901.

The ECU 990 may include an adjuster (such as potentiometer, a rheostat, an encoder switch, or momentary switches/jumpers, or the like) to control a set point, and input/outputs (I/O) for each of sending a signal to a solid state switch triode for alternating current (TRIAC) (a solid state switch that controls and activates the first heat source 940 and the second heat source 950). The ECU 990 may include an (I/O) for the first valve of the valve manifold 980, as well as at least one (I/O) for reading the signals from the flow sensor 960, the first temperature sensor 992, the second temperature sensor 993, the third temperature sensor 995, and the fourth temperature sensor 997. The ECU 990 may incorporate Pulse Width Modulation (PWM), Pulse Density Modulation (PDM), Phase Control or combination of the previous three methods and Proportional Integral Derivative (PID) control to manage power to the first and second heat sources (940, 950). The ECU 990 may read a set point for the predetermined temperature and the temperature detected by the first temperature sensor 992, the second temperature sensor 993, and/or the third temperature sensor 995 and choose a power level based a deviation between the temperatures. To achieve the set point, the PID control loop may be implemented with the PWM loop, Pulse Density Modulation (PDM), Phase Control or combination of the previous three methods.

Safety measures can be provided in order to prevent the instant discharge of hot fluid when a user inadvertently operates the activation switch 5 or is unaware of the result of operation (such with a small child). Such safety measures can include a time delay or a requirement that the activation switch 5 be operated, i.e., pressed, for a predetermined amount of time. The activation switch 5 may also include a dual motion sensor for initiating the operation of the fluid heating device 901. These safety mechanisms may prevent small children from activating the hot water and putting themselves in danger by touching the activation switch 5 briefly.

One advantage of the fluid heating system of FIG. 9 is the minimal standby power that is required to power the fluid heating device 901 in a standby mode of operation. Specifically, the power required is minimal (e.g. 0.3 watts) to monitor sensors, a system on/off button, and control the valve 982 in the valve manifold 980. Further, the valve 982 may be a solenoid valve which is arranged so that they will be in a non-powered state during periods when the fluid heating device is in standby mode. The minimal standby power provides another advantage over conventional fluid heating devices which are not used frequently. In an example where a single volume of fluid is dispensed over a period of time such as 24 hours, the fluid heating device 901 may use a minimal amount of power (e.g. 24-36 kJ), even though power is used to partially heat the fluid in the fluid heating system before supplying to the fluid discharge device 3. On the other hand, conventional fluid heating devices may use an amount of power over the same period which is substantial greater (e.g. 2000 kJ).

Figure 12:
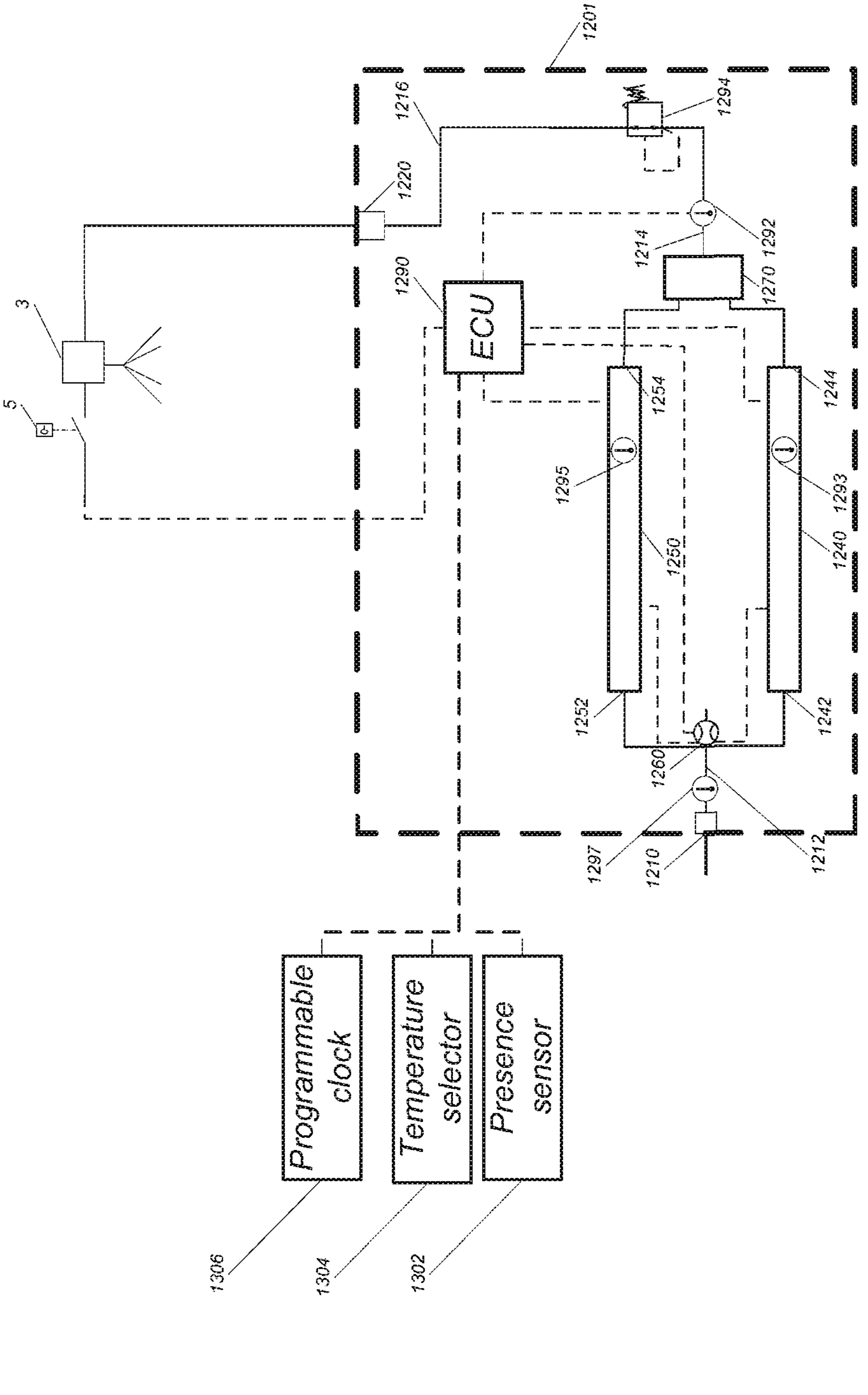
FIG. 12 schematically illustrates a fluid heating system according to one example.

FIG. 12 illustrates a fluid heating system according to one example that is incorporated on the housing 996, as illustrated in FIG. 10. In the fluid heating system illustrated in FIG. 12, a fluid heating device 1201 is provided and includes an inlet port 1210, an outlet port 1220, a first heat source 1240, a second heat source 1250, a flow sensor 1260, a manifold 1270, a first temperature sensor 1292, a second temperature sensor 1293, a third temperature sensor 1295, a fourth temperature 1297, a flow regulator 1294, and a ECU 1290.

In addition, the fluid heating device 1201 is provided with a presence sensor 1302, a temperature selector 1304 and a programmable clock 1306. The presence sensor 1302 which could be any device capable of detecting the presence of a user, such as an infrared detector, motion sensor or a switch mat, sends a signal to the ECU 1390 indicating the presence of someone inside a predetermined zone around the fluid discharge 3. The temperature selector 1304 can be any kind of mechanical or electrical variable input switch indicating to the ECU 1390 a desired temperature. For example, the temperature selector 1304 may have a similar appearance as a digital thermostat and may include a digital display of the desired temperature, as well as push buttons to input and adjust the desired temperature. The programmable clock 1306 sends a signal to the ECU 1290 indicating a desired time of utilization. The desired time of utilization may be entered by the user directly on the programmable clock 1306 and may correspond to an approximate time at which heated fluid will be needed, e.g. early in the morning.

The presence sensor 1302, the temperature selector 1304, and the programmable clock 1306 may be placed on the housing 996, see FIG. 10, of the fluid heating device 1201 and be internal parts of the fluid heating device 1201. Although not illustrated, at least one of the presence sensor 1302, the temperature selector 1304, and the programmable clock 1306 could also be placed at strategic remote locations apart from the fluid heating device 1201 and be in communication with the ECU 1390 by wired or wireless connections. For example, one of these strategic locations may be an entrance of a bathroom containing the fluid heating device 1201 or a front part of a sink cabinet containing the fluid heating device 1201.

The fluid heating device 1201 can be operated in at least three modes of operation by the ECU 1290.

In a first mode of operation, the ECU 1290 takes a reading of the desired temperature selected by the user via the temperature selector 1304 and maintains the heating device 1201 at the desired temperature.

Alternatively, the ECU 1290 could maintain the heating device 1201 at the desired temperature, as long as the switch 5 is activated and the ECU receives readings from the flow sensor 1260 indicating a flow rate above the predetermined flow rate.

In a second mode of operation, when the programmable clock 1306 sends a signal indicating a possible demand for heated fluid to the ECU 1290, the ECU 1290 takes a reading of the desired temperature selected by the user via the temperature selector 1304. Then, the ECU 1290 maintains the heating device 1201 at the desired temperature for a predetermined length of time, after which the ECU 1290 deactivates the supply of current to the first heat source 1240 and the second heat source 1250. The predetermined length of time may be set by the user or be preset by the manufacturer on the programmable clock 1306 or by the ECU 1290.

In addition to the predetermined length of time, the ECU 1290 could maintain the heating device 1201 at the predetermined temperature as long as the switch 5 is activated and/or the ECU receives readings from the flow sensor 960 indicating a flow rate above the predetermined flow rate.

In a third mode of operation, when the presence sensor 1302 sends a signal indicating the presence of the user inside the predetermined zone to the ECU 1290, the ECU 1290 takes a reading of the desired temperature selected by the user via the temperature selector 1304. Then, the ECU 1290 maintains the heating device 1201 at the desired temperature while the presence sensor 1302 detects the user and for a predetermined length of time after the presence sensor 1302 does not detect the user, after which the ECU 1290 deactivates the supply of current to the first heat source 1240 and the second heat source 1250.

In addition to the predetermined length of time and as in the first and second modes of operation, the ECU 1290 could maintain the heating device 1201 at the predetermined temperature as long as the switch 5 is activated and/or the ECU receives readings from the flow sensor 1260 indicating a flow rate above the predetermined flow rate.

In a fourth mode of operation, when the flow sensor 960 sends a signal indicating a flow rate below a predetermined threshold to the ECU 990, the ECU 990 maintains the heating device 901 within a predetermined range of temperatures that includes the desired temperature. The maintaining of the heating device 901 within the predetermined range of temperatures may be based on readings from the second temperature sensor 993 and/or the third temperature sensor 995. For example, when the desired temperature is 200° F., temperatures within the predetermined range may be between 180° F. and 220° F.

The fourth mode of operation provides the advantage of maintaining all the elements of the heating device 901, e.g. the fluid conduit 916, the heat sources 940 & 950 and the fluid, close to the desired temperature, in a state of readiness for a demand of heated fluid. Due to a heat diffusion from the heat sources 940 & 950, the elements near the heat source outlets 944 & 954, e.g. the first valve 982, may have temperatures close or within the predetermined range, while elements far away from the heat source outlets 944 & 954, e.g. the outlet port 920, may have temperatures within the predetermined range or close to the room temperature. As the elements of the heating device 901 are located away from the heat sources 940 & 950, e.g. In order the first valve 982, the manifold 980, the fluid conduit 916, and the outlet port 920, their respective temperature gradually decreases from the desired temperature towards the room temperature.

Consequently, due to this fourth mode of operation when a demand of heated fluid is detected by the ECU 990, heat losses due to mixing with the unheated fluid that may be contained in the heating device 901 is minimized and the delay in obtaining from the dispensing point 3 fluid at the desired temperature is greatly reduced.

Furthermore, the delay in obtaining from the dispensing point 3 water at the desired temperature may also be greatly reduced by minimizing the volume of fluid contained in the fluid conduit 916, e.g., minimizing the length and/or the diameter of the fluid conduit 916. In addition, the delay in obtaining from the dispensing point 3 water at the desired temperature may be reduced by placing the conduit fluid conduit 916 near the heat sources 940 & 950 to capture heat diffused by the heat sources 940 & 950.

In an alternative example of the fourth mode of operation, the heating device 901 may exclude the first valve 982 with or without the manifold 980. For example, the outlet conduit 916 may be directly connected to the intermediate fluid conduit 914, and the fluid may be conveyed from the flow regulator 994 to the outlet port 920, without passing through the valve manifold 980 and/or the valve 982. Excluding the valve manifold 980 and/or the valve 982 may result in limiting the number of elements used in the heating device 901 and making the heating device 901 smaller, more cost effective, and more reliable.

The fluid heating device 1201 may be operated in an alternative mode of operation combining the first mode, the second mode, the third mode, and/or the fourth mode. For example, in the alternative mode of operation, the ECU 1290 could maintain the heating device 1201 at the predetermined temperature during the predetermined length of time as soon as the switch 5 is activated and the flow sensor 1260 indicates a flow rate above the predetermined flow rate, or as soon as the programmable clock 1306 indicates a possible demand for heated fluid to the ECU 1290, or as soon as the presence sensor 1302 indicates the presence of the user inside the predetermined zone to the ECU 1290.

Figure 13:
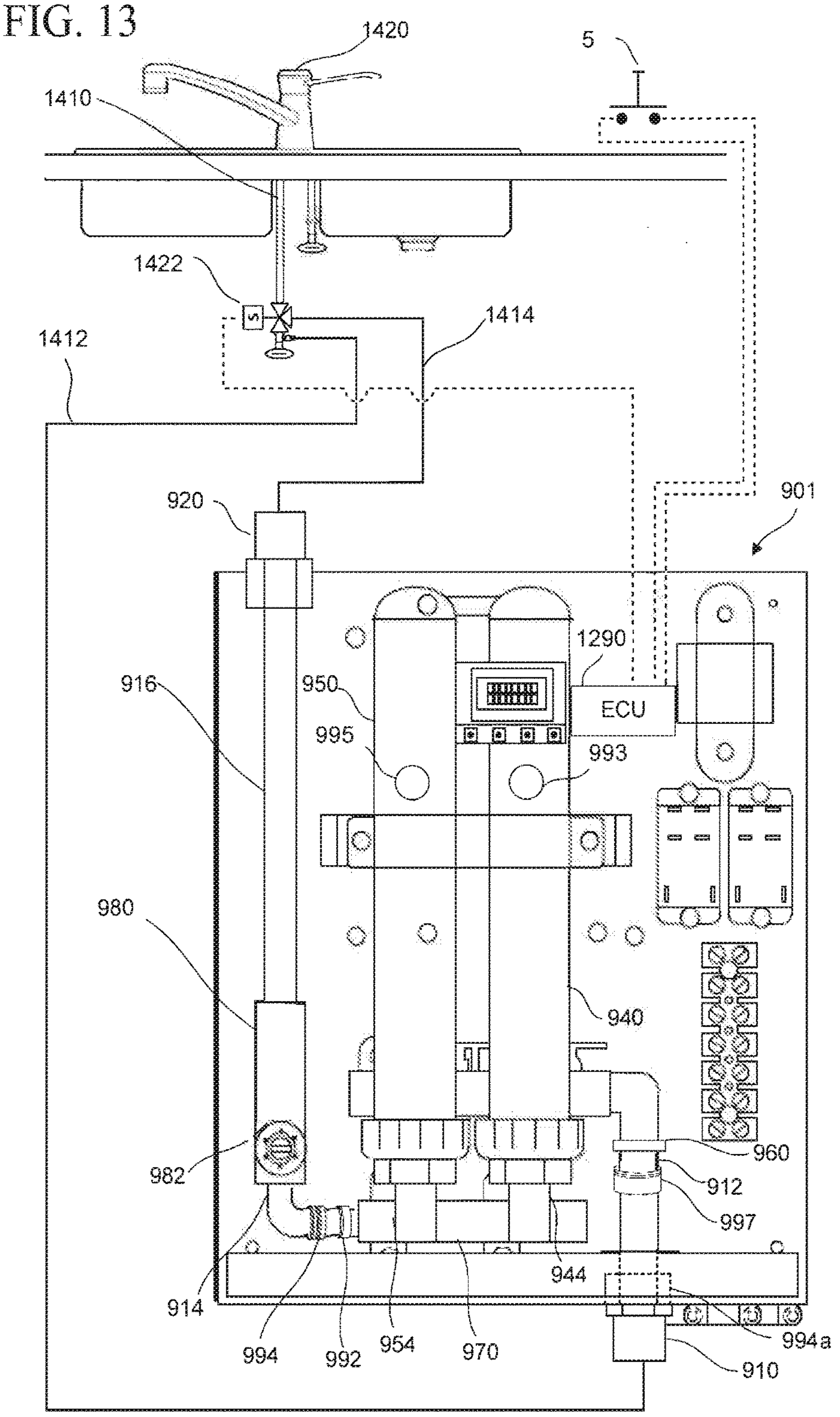
FIG. 13 illustrates another exemplary fluid heating system.
Figure 14:
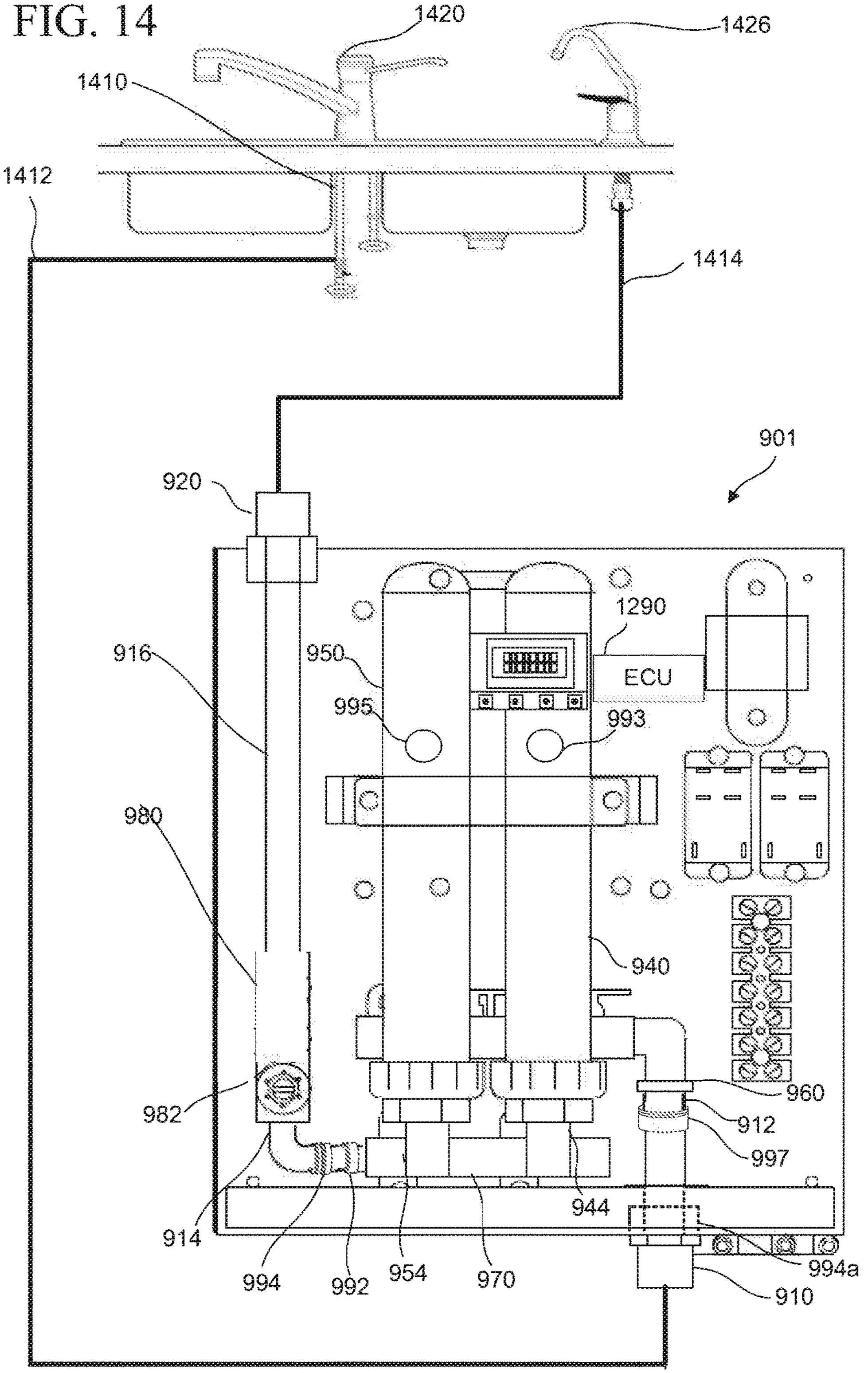
FIG. 14 illustrates another exemplary fluid heating system.

FIGS. 13 and 14 illustrate a fifth mode of operation of the fluid heating device 901. In one example, the heating system 901 may be configured to be used in a fifth mode of operation to boost and/or to provide a supplementary heating step to a preheated fluid. The preheated fluid may be supplied from a preexistent hot fluid source such as a central hot water distribution system.

The heating device 901 may be mounted to bypass a hot fluid conduit 1410 of the preexistent hot fluid source that feeds a dispensing device 1420, e.g. a faucet, with the preheated fluid. For example, the heating device 901 may be mounted between an inlet bypass conduit 1412 and an outlet bypass conduit 1414.

The inlet bypass conduit 1412 may include a first extremity connected to the inlet port 910 of the heating device 901 and a second extremity connected to the hot fluid conduit 1410 via a diverting valve 1422. The diverting valve 1422 may be a solenoid configured to be articulated from a bypass position to a pass position and vice-versa, wherein in the bypass position the preheated fluid indirectly passes through the heating device 901 before reaching the dispensing device 1420, while in the pass position the preheated fluid directly reaches the dispensing device 1420 without passing through to the heating device 901.

The outlet bypass conduit 1414 may include a first extremity connected to the outlet port 920 of the heating device 901 and a second extremity connected to the hot fluid conduit 1410 after the diverting valve 1422.

The heating device 901 may also include an internal flow restrictor **994*a* placed before the heat sources 940 & 960 and controllable by the ECU 1290 to maintain the fluid flowing inside the heating device 901 at an optimum flow rate, i.e. flow rate for which the heating device 901 most effectively heats the fluid to the desired temperature. For example, the optimum flow rate may be computed based on the desired temperature rise and the amount of power supplied to the heat sources 940 & 950**.

In the fifth mode of operation, first the hot fluid conduit 1410 is purged. For example, a user may activate the dispensing device 1420 to remove unheated fluid that may be present in the hot fluid conduit 1410.

Then, under a first action of the user, the switch 5, may send a first signal to the diverting valve 1422 and a second signal to the ECU 1290. The first signal may be configured to articulate the diverting valve 1422 from the pass position to the bypass position, while the second signal may be configured to indicate to the ECU 1290 that the preheated fluid needs to be heated to the desired temperature.

Then, the ECU 1290 may activate and regulate the power supplied to the heat sources 940 & 950 based on the desired temperature and readings from the first temperature sensor 992, the second temperature sensor 993, the third temperature sensor 995, the fourth temperature sensor 997, the flow sensor 960 or a combination thereof.

In addition, the ECU 1290 may activate the internal flow restrictor **994*a* to maintain the optimum flow rate inside the fluid heating device 901. Alternatively, the flow restrictor 994 may be an inline mechanical flow restrictor that is initially configured to restrict the flow at the optimum flow rate and does not require control signals from the ECU 1290**.

Finally, under a second action of the user, the switch 5 may send a third signal to the diverting valve 1422 and a fourth signal to the ECU 1290, wherein the third signal may be configured to articulate the diverting valve 1422 from the bypass position to the pass position, while the fourth signal may be configured to indicate to the ECU 1290 to turn off the heat sources 940 & 950.

Alternatively, the second extremity of the outlet bypass conduit 1414 may be connected to a dedicated dispensing device 1426, as illustrated in FIG. 14. In addition, the dedicated dispensing device 1426 may include an integrated switch or sensor to send the first signal and the second signal as soon as the dedicated dispensing device 1426 is activated in an open position and fluid flow occurs in the heating device 901, as well as to send the third signal and the fourth signal as soon as the dedicated dispensing device 1426 is activated in an closed position and fluid flow stops.

Due to the fact that for the fifth mode of operation the preheated fluid is used instead of unheated fluid, e.g., fluid at room temperature, as it is the case for the other modes of operation, the temperature rise implemented by the fifth mode of operation may be less important than the temperature implemented by the other modes of operation. Consequently, the elements of the heating device 901 in the fifth mode of operation, e.g. heat sources 940 & 950 and circuitry, and electrical installation do not required to be built and/or selected to withstand the same high level of demanding use as it is required by the other modes of operation. As a result, the elements of the heating device 901 for the fifth mode of operation may be smaller and more cost effective.

For example, the fifth mode of operation may require a power supply between 2.4 KW and 4.5 kW, for an inlet temperature of a preheated fluid between 120° F. and 140° F., a flow rate between 0.4 gpm and 0.5 gpm, and a desired temperature of 180° F. A 2.4 kW requirement may correspond to a 120 V-20 A electrical system which is available from a standard electrical outlet in most American homes.

On the contrary, the other modes of operation may require a power supply between 9 KW and 12 kW, for an inlet temperature of a non-preheated fluid between 45° F. and 55° F., a flow rate between 0.4 gpm and 0.5 gpm, and a desired temperature at 180° F. A 12 kW power requirement may need a 240 V-50 A electrical system which may not be easily and/or directly accessible from a standard electrical outlet.

In an alternative example of the fifth mode of operation, the heating device 901 may exclude the first valve 982 with or without the manifold 980. For example, the outlet conduit 916 may be directly connected to the intermediate fluid conduit 914, and the fluid may be conveyed from the flow regulator 994 to the outlet port 920, without passing through the valve manifold 980 and/or the valve 982. Excluding the valve manifold 980 and/or the valve 982 may result in limiting the number of elements used in the heating device 901 and making the heating device 901 smaller, more cost effective, and more reliable.

In all the modes of operation, in order to maintain the heating device 1201 at desired temperature, the ECU 1290 may take readings from at least one of the first temperature sensor 1292, the second temperature sensor 1293, the third temperature sensor 1295 and the fourth temperature sensor 1297 as described herein. The ECU 1290 may regulate the power supplied to the first heat source 1240 or the second heat source 1250 according to the readings from the second temperature sensor 1293 or the third temperature sensor 1295. For example, the ECU 1290 may regulate the current supplied to the heat sources by Pulse Width Modulation (PWM), Pulse Density Modulation (PDM), Phase Control or combination of the previous three methods.

For example, when the temperature detected by the second temperature sensor 1293 or the third temperature sensor 1295 is substantially below the desired temperature, e.g. 20% below the desired temperature, the ECU 1290 supplies current to the first heat source 1240 and the second heat source 1250. When the temperature detected by the second temperature sensor 1293 or the third temperature sensor 1295 is substantially above the desired temperature, e.g. 20% above the desired temperature, the ECU 1290 deactivates the supply of current to first heat source 1240 and the second heat source 1250.

The ECU 1290 may include an adjuster (such as potentiometer, a rheostat, an encoder switch, or momentary switches/jumpers, or the like) to control a set point, and input/outputs (I/O) for each of sending a signal to a solid state switch triode for alternating current (TRIAC) (a solid state switch that controls heat sources and turns them on and off), reading the signal from the flow sensor 1260, reading the first temperature sensor 1292, reading the second temperature sensor 1293, reading the third temperature sensor 1295, reading the signal from the presence sensor 1302, reading the signal from the temperature selector 1304, and reading the signal from the programmable clock 1306. The ECU 1290 may incorporate Pulse Width Modulation (PWM), Pulse Density Modulation (PDM), Phase Control or combination of the previous three methods and Proportional Integral Derivative (PID) control to manage power the first and second heat sources (1240, 1250). The ECU 1290 may read a set point for the predetermined temperature and the temperature detected by the first temperature sensor 1292, the second temperature sensor 1293, and/or the third temperature sensor 1295 and choose a power level based a deviation between the temperatures. To achieve the set point, the PID control loop may be implemented with the PWM loop, Pulse Density Modulation (PDM), Phase Control or combination of the previous three methods.

One advantage of the fluid heating system of FIG. 12 is the instantaneity of both modes of operation. With the fluid heating system of FIG. 12, heated fluid can be dispensed at the fluid discharge device 3 as soon as the switch 5 is activated at the desired temperature, in this fluid heating system, no waiting time is required before obtaining heated fluid since the fluid contained in the heating device 601 is maintained at the desired temperature continually or any time that a possible need for heated fluid is detected by the ECU 1290 via the presence detector 1302 or the programmable clock 1306.

Figure 15:
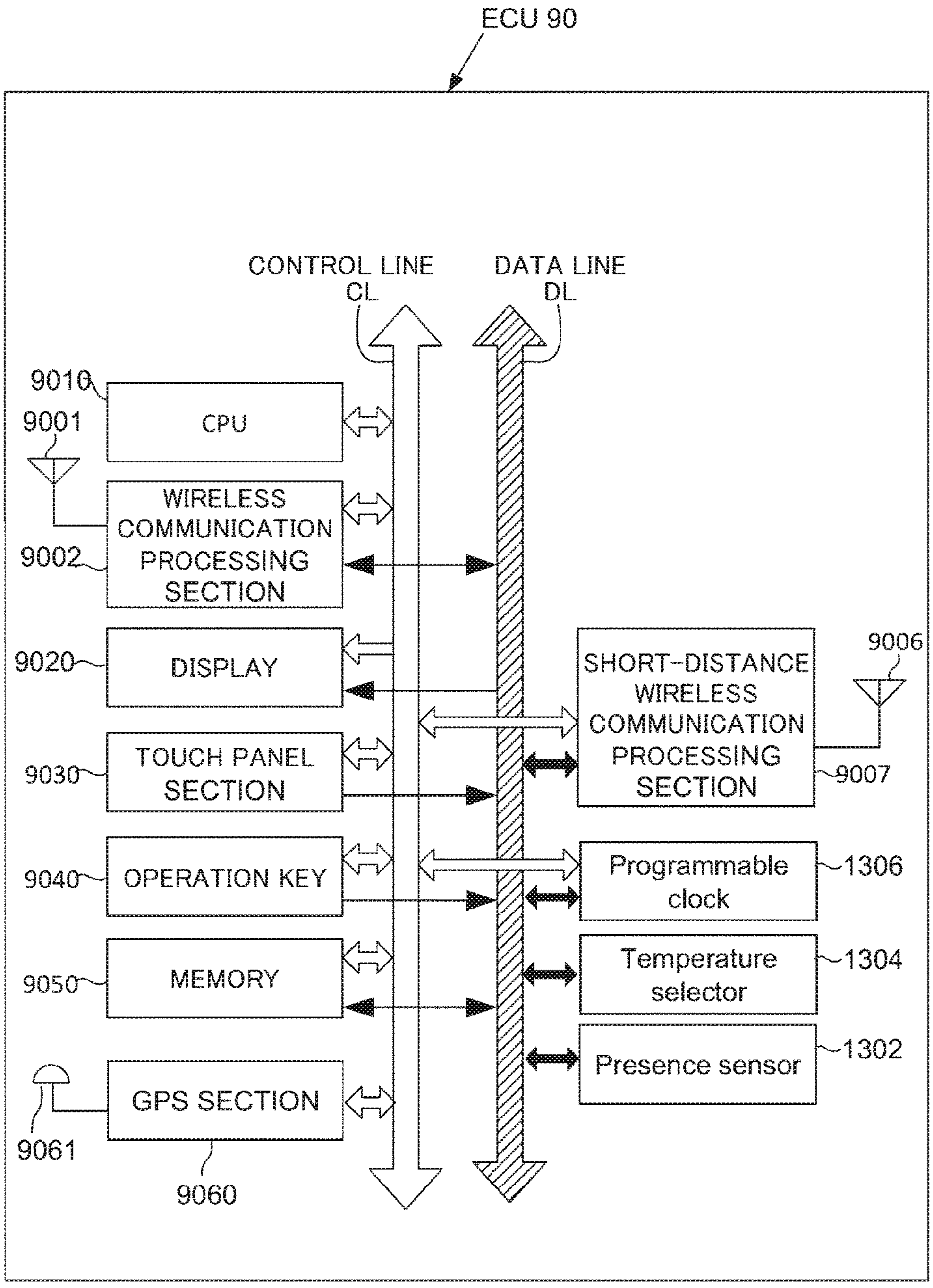
FIG. 15 illustrates an Electrical Control Unit of the fluid heating system according to one example.

FIG. 15 is a block diagram illustrating the ECU 90, which is similar to the ECUs 290, 390, 590, and 690, for implementing the functionality of the fluid heating device 1 described herein, according to one example. The skilled artisan will appreciate that the features described herein may be adapted to be implemented on a variety of devices (e.g., a laptop, a tablet, a server, an e-reader, navigation device, etc.). The ECU 90 includes a Central Processing Unit (CPU) 9010 and a wireless communication processor 9002 connected to an antenna 9001.

The CPU 9010 may include one or more CPUs 9010, and may control each element in the ECU 90 to perform functions related to communication control and other kinds of signal processing. The CPU 9010 may perform these functions by executing instructions stored in a memory 9050. Alternatively or in addition to the local storage of the memory 9050, the functions may be executed using instructions stored on an external device accessed on a network or on a non-transitory computer readable medium.

The memory 9050 includes but is not limited to Read Only Memory (ROM), Random Access Memory (RAM), or a memory array including a combination of volatile and non-volatile memory units. The memory 9050 may be utilized as working memory by the CPU 9010 while executing the processes and algorithms of the present disclosure. Additionally, the memory 9050 may be used for long-term data storage. The memory 9050 may be configured to store information and lists of commands.

The controller 120 includes a control line CL and data line DL as internal communication bus lines. Control data to/from the CPU 9010 may be transmitted through the control line CL. The data line DL may be used for transmission of data.

The antenna 9001 transmits/receives electromagnetic wave signals between base stations for performing radio-based communication, such as the various forms of cellular telephone communication. The wireless communication processor 9002 controls the communication performed between the ECU 90 and other external devices via the antenna 9001. For example, the wireless communication processor 9002 may control communication between base stations for cellular phone communication.

The ECU 90 may also include the display 9020, a touch panel 9030, an operation key 9040, and a short-distance communication processor 9007 connected to an antenna 9006. The display 9020 may be a Liquid Crystal Display (LCD), an organic electroluminescence display panel, or another display screen technology. In addition to displaying still and moving image data, the display 9020 may display operational inputs, such as numbers or icons which may be used for control of the ECU 90. The display 9020 may additionally display a GUI for a user to control aspects of the ECU 90 and/or other devices. Further, the display 9020 may display characters and images received by the ECU 90 and/or stored in the memory 9050 or accessed from an external device on a network. For example, the ECU 90 may access a network such as the Internet and display text and/or images transmitted from a Web server.

The touch panel 9030 may include a physical touch panel display screen and a touch panel driver. The touch panel 9030 may include one or more touch sensors for detecting an input operation on an operation surface of the touch panel display screen. The touch panel 9030 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 930 may detect when the stylus approaches/contacts the operation surface of the touch panel display (similar to the case in which a finger is used for the touch operation).

In certain aspects of the present disclosure, the touch panel 9030 may be disposed adjacent to the display 9020 (e.g., laminated) or may be formed integrally with the display 9020. For simplicity, the present disclosure assumes the touch panel 9030 is formed integrally with the display 9020 and therefore, examples discussed herein may describe touch operations being performed on the surface of the display 9020 rather than the touch panel 9030. However, the skilled artisan will appreciate that this is not limiting.

For simplicity, the present disclosure assumes the touch panel 9030 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 9030 may include transparent electrode touch sensors arranged in the X-Y direction on the surface of transparent sensor glass.

The operation key 9040 may include one or more buttons or similar external control elements, which may generate an operation signal based on a detected input by the user. In addition to outputs from the touch panel 9030, these operation signals may be supplied to the CPU 9010 for performing related processing and control. In certain aspects of the present disclosure, the processing and/or functions associated with external buttons and the like may be performed by the CPU 9010 in response to an input operation on the touch panel 9030 display screen rather than the external button, key, etc. In this way, external buttons on the ECU 90 may be eliminated in lieu of performing inputs via touch operations, thereby improving water-tightness.

The antenna 9006 may transmit/receive electromagnetic wave signals to/from other external apparatuses, and the short-distance wireless communication processor 9007 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 9007.

In addition, The ECU 90 may be connected or include the programmable clock 1306, the temperature selector 1304, and/or the presence sensor 1302.

A number of fluid heating systems have been described. Nevertheless, it will be understood that various modifications made to the fluid heating systems described herein fall within the scope of this disclosure. For example, advantageous results may be achieved if the steps of the disclosed techniques were performed in a different sequence, if components in the disclosed systems were combined in a different manner, or if the components were replaced or supplemented by other components.

Thus, the foregoing discussion discloses and describes merely exemplary embodiments. Accordingly, this disclosure is intended to be illustrative, but not limiting of the scope of the fluid heating systems described herein, as well as other claims. The disclosure, including any readily discernible variants of the teachings herein, define, in part, the scope of the foregoing claim terminology such that no inventive subject matter is dedicated to the public.

The invention claimed is:

1. A fluid heating device comprising:

an inlet port;

an outlet port;

at least one heat source connected with the inlet port and having a first heat source outlet;

a valve connected to the at least one heat source and the outlet port;

a first temperature sensor connected to the at least one heat source for detecting a first temperature of fluid inside the at least one heat source; and an ECU that regulates a power supply to the at least one heat source, wherein the ECU actuates the valve to discharge fluid from the outlet port when the first temperature of fluid inside the at least one heat source is at or above a predetermined temperature.

2. The fluid heating device of claim 1, further comprising:

a flow sensor detecting a flow rate of fluid upstream of the at least one heat source, wherein the ECU actuates the at least one heat source to heat fluid when the flow rate of fluid upstream of the at least one heat source is at or above a predetermined flow rate.

3. The fluid heating device of claim 1, wherein the at least one heat source includes a first heat source and a second heat source, the first heat source includes the first heat source outlet, the second heat source includes a second heat source outlet, and the first heat source outlet and the second heat source outlet are connected to a manifold, the manifold being connected to the valve.

4. The fluid heating device of claim 1, further comprising:

a first conduit that connects the inlet port to the at least one heat source;

a second conduit that connects the at least one heat source to the valve; and a third conduit that connects the valve to the outlet port.

5. The fluid heating device of claim 4, further comprising:

a flow control device provided in the first conduit downstream of a manifold, wherein the ECU actuates the at least one heat source to heat fluid in the fluid heating device in response to a flow of fluid upstream of the at least one heat source being equal to or greater than the predetermined flow rate, and the flow control device controls a flow of fluid downstream of the manifold to be equal to the predetermined flow rate.

6. The fluid heating device of claim 1, further comprising:

a second temperature sensor connected to the valve for detecting a second temperature of fluid downstream of the at least one heat source; and a third temperature sensor connected to the inlet for detecting a third temperature of fluid upstream of the at least one heat source, wherein the ECU supplies power to the at least one heat source based on the second temperature and the third temperature.

7. The fluid heating device of claim 1, further comprising:

a second temperature sensor connected to the valve for detecting a second temperature of fluid downstream of the at least one heat source; and a third temperature sensor connected to the inlet for detecting a third temperature of fluid upstream of the at least one heat source, wherein the ECU supplies power to the at least one heat source based on the first temperature, the second temperature, and the third temperature.

8. The fluid heating device of claim 1, further comprising:

a second temperature sensor connected to the valve for detecting a second temperature of fluid downstream of the at least one heat source;

a third temperature sensor connected to the inlet for detecting a third temperature of fluid upstream of the at least one heat source; and a flow sensor connected to the inlet port for detecting a upstream flow rate of fluid upstream of the at least one heat source, wherein the ECU supplies power to the at least one heat source based on the second temperature, the third temperature, and the upstream flow rate.

9. The fluid heating device of claim 1, further comprising:

a second temperature sensor connected to the valve for detecting a second temperature of fluid downstream of the at least one heat source; and a third temperature sensor connected to the inlet for detecting a third temperature of fluid upstream of the at least one heat source; and a flow sensor connected to the inlet port for detecting a upstream flow rate of fluid upstream of the at least one heat source, wherein the ECU supplies power to the at least one heat source based on the first temperature, the second temperature, the third temperature, and the upstream flow rate.

10. The fluid heating device of claim 1, further comprising:

a temperature selector that sets a fluid temperature, wherein the ECU actuates the at least one heat source to maintain fluid at the set fluid temperature.

11. The fluid device of claim 1, further includes:

a temperature selector that sets a fluid temperature; and a presence sensor that detects a presence, wherein the ECU actuates the at least one heat source to maintain fluid at the set fluid temperature while the presence is detected, and the ECU deactivates the at least one heat source when the presence is no longer detected.

12. The fluid heating device of claim 1, further comprising:

a temperature selector that sets a desired fluid temperature; and a programmable clock programmed with a predetermined time and a predetermined period, wherein the ECU actuates the at least one heat source to maintain fluid at the desired fluid temperature when the programmable clock indicates the predetermined time, and the ECU deactivates the at least one heat source after the predetermined period.

13. A fluid heating system comprising:

a fluid discharge device connected to an outlet port;

a switch connected to the fluid discharge device; and a fluid heating device including:

an inlet port, an outlet port, at least one heat source connected with the inlet port and having a first heat source outlet, a first temperature sensor connected to the at least one heat source for detecting a first temperature of fluid inside the at least one heat source; and a ECU that activates and regulates a power supply to the at least one heat source when the first temperature is below a predetermined temperature.

14. The fluid heating system of claim 13, further comprising:

a second temperature sensor for detecting a second temperature of fluid downstream of the at least one heat source; and a third temperature sensor connected to the inlet for detecting a third temperature of fluid upstream of the at least one heat source, wherein the ECU supplies power to the at least one heat source based on the second temperature and the third temperature.

15. The fluid heating system of claim 13, further comprising:

a second temperature sensor for detecting a second temperature of fluid downstream of the at least one heat source; and a third temperature sensor connected to the inlet for detecting a third temperature of fluid upstream of the at least one heat source, wherein the ECU supplies power to the at least one heat source based on the first temperature, the second temperature, and the third temperature.

16. The fluid heating system of claim 13, further comprising:

a second temperature sensor for detecting a second temperature of fluid downstream of the at least one heat source;

a third temperature sensor connected to the inlet for detecting a third temperature of fluid upstream of the at least one heat source; and a flow sensor connected to the inlet port for detecting a upstream flow rate of fluid upstream of the at least one heat source, wherein the ECU supplies power to the at least one heat source based on the second temperature, the third temperature, and the upstream flow rate.

17. The fluid heating system of claim 13, further comprising:

a second temperature sensor for detecting a second temperature of fluid downstream of the at least one heat source; and a third temperature sensor connected to the inlet for detecting a third temperature of fluid upstream of the at least one heat source; and a flow sensor connected to the inlet port for detecting a upstream flow rate of fluid upstream of the at least one heat source, wherein the ECU regulates a power supply to the at least one heat source based on the first temperature, the second temperature, the third temperature, and the upstream flow rate.

18. The fluid heating system of claim 13, further comprising:

a temperature selector that sets a fluid temperature, wherein the ECU actuates the at least one heat source to maintain fluid at the set fluid temperature.

19. The fluid heating system of claim 13, further comprising:

a temperature selector sets a fluid temperature; and a presence sensor that detects a presence, wherein the ECU actuates the at least one heat source to maintain fluid at the set fluid temperature while the presence is detected, and the ECU deactivates the at least one heat source when the presence is no longer detected.

20. The fluid heating system of claim 13, further comprising:

a temperature selector that sets a fluid temperature; and a programmable clock programmed with a predetermined time and a predetermined period, wherein the ECU actuates the at least one heat source to maintain fluid at the set fluid temperature when the programmable clock indicates the predetermined time, and the ECU deactivates the at least one heat source after the predetermined period.

* * * * *